United States Patent
Isobe et al.

(10) Patent No.: US 8,655,155 B2
(45) Date of Patent: Feb. 18, 2014

(54) RECORDING APPARATUS, RECORDING METHOD, AND RECORDING PROGRAM, AND IMAGE CAPTURING APPARATUS, IMAGE CAPTURING METHOD, AND IMAGE CAPTURING PROGRAM

(75) Inventors: Yukio Isobe, Kanagawa (JP); Kenichiro Aridome, Kanagawa (JP); Naoki Morimoto, Tokyo (JP); Atsushi Mae, Kanagawa (JP); Tetsuhiro Maeda, Kanagawa (JP)

(73) Assignee: Sony Corporation (JP)

( * ) Notice: Subject to any disclaimer, the term of this patent is extended or adjusted under 35 U.S.C. 154(b) by 1473 days.

(21) Appl. No.: 11/992,885

(22) PCT Filed: Jul. 25, 2007

(86) PCT No.: PCT/JP2007/065038
§ 371 (c)(1),
(2), (4) Date: Mar. 25, 2008

(87) PCT Pub. No.: WO2008/013311
PCT Pub. Date: Jan. 31, 2008

(65) Prior Publication Data
US 2010/0008647 A1     Jan. 14, 2010

(30) Foreign Application Priority Data
Jul. 26, 2006   (JP) ................ P2006-203038

(51) Int. Cl.
H04L 29/06       (2006.01)
(52) U.S. Cl.
USPC .......................... 386/337; 380/201
(58) Field of Classification Search
USPC ................. 386/337, 334; 380/201
See application file for complete search history.

(56) References Cited

U.S. PATENT DOCUMENTS 6,393,201 B1   5/2002  Sakuramoto et al.
6,633,724 B1   10/2003 Hasegawa et al.
(Continued)

FOREIGN PATENT DOCUMENTS

JP   2002-084498 A   3/2002
JP   2004-328450 A   11/2004
(Continued)

OTHER PUBLICATIONS

Supplementary European Search Report EP 07791722, dated Aug. 8, 2011.

*Primary Examiner* — David Garcia Cervetti
(74) *Attorney, Agent, or Firm* — Lerner, David, Littenberg, Krumholz & Mentlik, LLP

(57) ABSTRACT

Management information for video data and audio data that are created after their recording is started until it is stopped and that are recorded as a stream file on a record medium is more securely stored. When their recording is started, EP entry information contained in management information of the stream file is created. Whenever EP entry information is created, it is written to a nonvolatile memory. After their recording is stopped, fixed value information and so forth that are contained in the management information are created and written to the nonvolatile memory. According to a disc eject operation, the management information written to the nonvolatile memory is written to the disc and the contents stored in the nonvolatile memory are cleared. Likewise, when power is turned off without the eject operation, information stored in the nonvolatile memory is written to the disc. Since the management information is stored in the nonvolatile memory, even if power is unexpectedly turned off, the management information will not be lost.

9 Claims, 35 Drawing Sheets

(56) References Cited

U.S. PATENT DOCUMENTS

| | | |
|---|---|---|
| 7,062,156 B2 | 6/2006 | Nakatani et al. |
| 7,855,749 B2 * | 12/2010 | Yamano et al. ............... 348/372 |
| 8,224,155 B2 * | 7/2012 | Hamada ........................ 386/248 |
| 2002/0018644 A1 | 2/2002 | Isobe et al. |
| 2002/0141431 A1 * | 10/2002 | Tripathy .......................... 370/428 |
| 2002/0170059 A1 * | 11/2002 | Hoang ............................. 725/54 |
| 2003/0086568 A1 * | 5/2003 | Kato et al. ..................... 380/201 |
| 2003/0133441 A1 * | 7/2003 | Watanabe et al. .............. 370/352 |
| 2003/0175013 A1 * | 9/2003 | Kato et al. ........................ 386/94 |
| 2004/0213053 A1 * | 10/2004 | Kato et al. ..................... 365/200 |
| 2004/0239800 A1 * | 12/2004 | Yamano et al. ............... 348/372 |
| 2005/0163225 A1 * | 7/2005 | Im et al. .................... 375/240.25 |
| 2005/0169612 A1 * | 8/2005 | Lee ............................... 386/126 |
| 2005/0175321 A1 | 8/2005 | Aridome et al. |
| 2005/0244138 A1 * | 11/2005 | O'Connor et al. ............... 386/94 |
| 2005/0254363 A1 | 11/2005 | Hamada et al. |
| 2006/0007814 A1 * | 1/2006 | Kiyama et al. ................ 369/47.1 |
| 2006/0133241 A1 * | 6/2006 | Nakata .......................... 369/47.5 |
| 2007/0143566 A1 * | 6/2007 | Gorobets ....................... 711/202 |
| 2007/0143567 A1 * | 6/2007 | Gorobets ....................... 711/202 |
| 2007/0156998 A1 * | 7/2007 | Gorobets ....................... 711/170 |
| 2007/0256100 A1 * | 11/2007 | Jeong .............................. 725/40 |
| 2008/0008447 A1 * | 1/2008 | Iwase et al. ..................... 386/95 |
| 2008/0136944 A1 * | 6/2008 | Yamano et al. .......... 348/231.99 |

FOREIGN PATENT DOCUMENTS

| | | |
|---|---|---|
| JP | 2004-350251 A | 12/2004 |
| WO | 0250829 A1 | 6/2002 |

\* cited by examiner

Fig. 6

| SYNTAX | DATA LENGTH (BITS) | MNEMONIC |
|---|---|---|
| Index table file { | | |
|     TypeIndicator | 8 * 4 | bslbf |
|     TypeIndicator2 | 8 * 4 | bslbf |
|     IndexesStartAddress | 32 | uimsbf |
|     ExtensionDataStartAddress | 32 | uimsbf |
|     reserved | 192 | bslbf |
|     blkAppInfoBDMV() | | |
|     for (i=0; i<N1; i++) { | | |
|         padding_word | 16 | bslbf |
|     } | | |
|     blkIndexes() | | |
|     for (i=0; i<N2; i++) { | | |
|         padding_word | 16 | bslbf |
|     } | | |
|     blkExtensionData() | | |
|     for (i=0; i<N3; i++) { | | |
|         padding_word | 16 | bslbf |
|     } | | |
| } | | |

Fig. 7

| SYNTAX | DATA LENGTH (BITS) | MNEMONIC |
|---|---|---|
| blkIndexes() { | | |
|     Length | 32 | uimsbf |
|     FirstPlaybackTitle() { | | |
|         reserved | 1 | bslbf |
|         '1' | 1 | bslbf |
|         reserved | 31 | bslbf |
|         '1' | 1 | bslbf |
|         reserved | 14 | bslbf |
|         FirstPlaybackTitleMobjIDRef | 16 | uimsbf |
|         reserved | 32 | bslbf |
|     } | | |
|     MenuTitle() { | | |
|         reserved | 1 | bslbf |
|         '1' | 1 | bslbf |
|         reserved | 31 | bslbf |
|         '1' | 1 | bslbf |
|         reserved | 14 | bslbf |
|         MenuTitleMobjIDRef | 16 | uimsbf |
|         reserved | 32 | bslbf |
|     } | | |
|     NumberOfTitles | 16 | uimsbf |
|     for (title_id=0; title_id < NumberOfTitles; title_id++) { | | |
|         MovieTitle[title_id]() { | | |
|             reserved | 1 | bslbf |
|             '1' | 1 | bslbf |
|             reserved | 46 | bslbf |
|             MovieTitleMobjIDRef[title_id] | 16 | uimsbf |
|             reserved | 32 | bslbf |
|         } | | |
|     } | | |
| } | | |

Fig. 8

| SYNTAX | DATA LENGTH (BITS) | MNEMONIC |
|---|---|---|
| MovieObject file { | | |
|     TypeIndicator | 8 * 4 | bslbf |
|     TypeIndicator2 | 8 * 4 | bslbf |
|     ExtensionDataStartAddress | 32 | uimsbf |
|     reserved | 224 | bslbf |
|     blkMovieObjects() | | |
|     for (i=0; i<N1; i++) { | | |
|         padding_word | 16 | bslbf |
|     } | | |
|     blkExtensionData() | | |
|     for (i=0; i<N2; i++) { | | |
|         padding_word | 16 | bslbf |
|     } | | |
| } | | |

*Fig. 9*

| SYNTAX | DATA LENGTH (BITS) | MNEMONIC |
|---|---|---|
| blkMovieObjects() { | | |
|   Length | 32 | uimsbf |
|   reserved | 32 | bslbf |
|   NumberOfMobjs | 16 | uimsbf |
|   for (mobj_id=0; mobj_id<NumberOfMobjs; mobj_id++) { | | |
|     MovieObject[mobj_id]() { | | |
|       TerminalInfo() { | | |
|         "1" | 1 | bslbf |
|         reserved | 15 | bslbf |
|       } | | |
|       NumberOfNavigationCommands[mobj_id] | 16 | uimsbf |
|       for (command_id=0;<br>        command_id<NumberOfNavigationCommands[mobj_id];<br>        command_id++){ | | |
|         NavigationCommand[mobj_id][command_id] | 96 | bslbf |
|       } | | |
|     } | | |
|   } | | |
| } | | |

Fig. 10

| SYNTAX | DATA LENGTH (BITS) | MNEMONIC |
|---|---|---|
| Movie PlayList file { | | |
|     TypeIndicator | 8 * 4 | bslbf |
|     TypeIndicator2 | 8 * 4 | bslbf |
|     PlayListStartAddress | 32 | uimsbf |
|     PlayListMarkStartAddress | 32 | uimsbf |
|     ExtensionDataStartAddress | 32 | uimsbf |
|     reserved | 160 | bslbf |
|     blkAppInfoPlayList() | | |
|     for (i=0; i<N1; i++) { | | |
|         padding_word | 16 | bslbf |
|     } | | |
|     blkPlayList() | | |
|     for (i=0; i<N2; i++) { | | |
|         padding_word | 16 | bslbf |
|     } | | |
|     blkPlayListMark() | | |
|     for (i=0; i<N3; i++) { | | |
|         padding_word | 16 | bslbf |
|     } | | |
|     blkExtensionData() | | |
|     for (i=0; i<N4; i++) { | | |
|         padding_word | 16 | bslbf |
|     } | | |
| } | | |

Fig. 11

| SYNTAX | DATA LENGTH (BITS) | MNEMONIC |
|---|---|---|
| blkPlayList() { | | |
|     Length | 32 | uimsbf |
|     reserved | 16 | bslbf |
|     NumberOfPlayItems | 16 | uimsbf |
|     NumberOfSubPaths | 16 | uimsbf |
|     for(PlayItem_id=0;<br>        PlayItem_id<NumberOfPlayItems; PlayItem_id++) { | | |
|         blkPlayItem() | | |
|     } | | |
|     for(SubPath_id=0;<br>        SubPath_id<NumberOfSubPaths; SubPath_id++) { | | |
|         blkSubPath() | | |
|     } | | |
| } | | |

Fig. 12

| SYNTAX | DATA LENGTH (BITS) | MNEMONIC |
|---|---|---|
| blkPlayItem() { | | |
|     Length | 16 | uimsbf |
|     ClipInformationFileName | 8 * 5 | bslbf |
|     ClipCodecIdentifier | 8 * 4 | bslbf |
|     reserved | 12 | bslbf |
|     ConnectionCondition | 4 | bslbf |
|     RefToSTCID | 8 | uimsbf |
|     INTime | 32 | uimsbf |
|     OUTTime | 32 | uimsbf |
|     blkUOMaskTable() | | |
|     PlayItemRandomAccessFlag | 1 | bslbf |
|     reserved | 7 | bslbf |
|     StillMode | 8 | bslbf |
|     if (StillMode== 0x01){ | | |
|         StillTime | 16 | uimsbf |
|     } else { | | |
|         reserved | 16 | bslbf |
|     } | | |
|     blkSTNTable() | | |
| } | | |

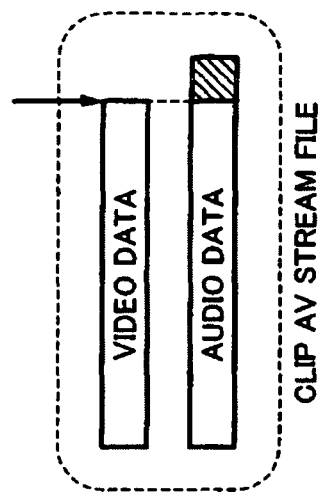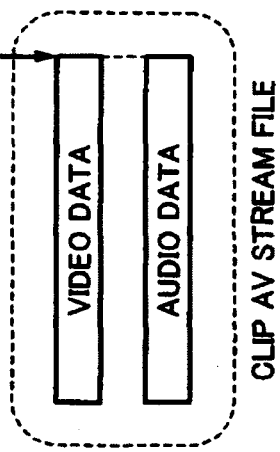
Fig. 13A
Fig. 13B

Fig. 14

| SYNTAX | DATA LENGTH (BITS) | MNEMONIC |
|---|---|---|
| blkPlayListMark() { | | |
|     Length | 32 | uimsbf |
|     NumberOfPlayListMarks | 16 | uimsbf |
|     for(PL_mark_id=0;<br>        PL_mark_id< NumberOfPlayListMarks;<br>        PL_mark_id++) { | | |
|         reserved | 8 | bslbf |
|         MarkType | 8 | bslbf |
|         RefToPlayItemID | 16 | uimsbf |
|         MarkTimeStamp | 32 | uimsbf |
|         EntryESPID | 16 | uimsbf |
|         Duration | 32 | uimsbf |
|     } | | |
| } | | |

Fig. 15

| SYNTAX | DATA LENGTH (BITS) | MNEMONIC |
|---|---|---|
| Clip information file { | | |
|     TypeIndicator | 8 * 4 | bslbf |
|     TypeIndicator2 | 8 * 4 | bslbf |
|     SequenceInfoStartAddress | 32 | uimsbf |
|     ProgramInfoStartAddress | 32 | uimsbf |
|     CPIStartAddress | 32 | uimsbf |
|     ClipMarkStartAddress | 32 | uimsbf |
|     ExtensionDataStartAddress | 32 | uimsbf |
|     reserved | 96 | bslbf |
|     blkClipInfo() | | |
|     for (i=0; i<N1; i++) { | | |
|         padding_word | 16 | bslbf |
|     } | | |
|     blkSequenceInfo() | | |
|     for (i=0; i<N2; i++) { | | |
|         padding_word | 16 | bslbf |
|     } | | |
|     blkProgramInfo() | | |
|     for (i=0; i<N3; i++) { | | |
|         padding_word | 16 | bslbf |
|     } | | |
|     blkCPI() | | |
|     for (i=0; i<N4; i++) { | | |
|         padding_word | 16 | bslbf |
|     } | | |
|     blkClipMark() | | |
|     for (i=0; i<N5; i++) { | | |
|         padding_word | 16 | bslbf |
|     } | | |
|     blkExtensionData() | | |
|     for (i=0; i<N6; i++) { | | |
|         padding_word | 16 | bslbf |
|     } | | |
| } | | |

Fig. 16

| SYNTAX | DATA LENGTH (BITS) | MNEMONIC |
| --- | --- | --- |
| blkClipInfo() { | | |
|     Length | 32 | uimsbf |
|     reserved | 16 | bslbf |
|     ClipStreamType | 8 | bslbf |
|     ApplicationType | 8 | bslbf |
|     reserved | 31 | bslbf |
|     IsCC5 | 1 | bslbf |
|     TSRecordingRate | 32 | uimsbf |
|     NumberOfSourcePackets | 32 | uimsbf |
|     reserved | 1024 | bslbf |
|     TSTypeInfoBlock() | | |
|     if (IsCC5 ==1$_b$) { | | |
|         reserved | 8 | bslbf |
|         FollowingClipStreamType | 8 | bslbf |
|         reserved | 32 | bslbf |
|         FollowingClipInformationFileName | 8 * 5 | bslbf |
|         ClipCodecIdentifier | 8 * 4 | bslbf |
|         reserved | 8 | bslbf |
|     } | | |
| } | | |

Fig. 17

| SYNTAX | DATA LENGTH (BITS) | MNEMONIC |
|---|---|---|
| blkSequenceInfo() { | | |
|     Length | 32 | uimsbf |
|     reserved | 15 | bslbf |
|     '1' | 1 | bslbf |
|     SPNATCStart | 32 | uimsbf |
|     NumberOfSTCSequences | 8 | uimsbf |
|     reserved | 8 | uimsbf |
|     for (stc_id=0; stc_id<NumberOfSTCSequences; stc_id++) { | | |
|         PCRPID[stc_id] | 16 | uimsbf |
|         SPNSTCStart[stc_id] | 32 | uimsbf |
|         PresentationStartTime[stc_id] | 32 | uimsbf |
|         PresentationEndTime[stc_id] | 32 | uimsbf |
|     } | | |
| } | | |

Fig. 18

| SYNTAX | DATA LENGTH (BITS) | MNEMONIC |
|---|---|---|
| blkProgramInfo() { | | |
|   Length | 32 | uimsbf |
|   reserved | 15 | bslbf |
|   '1' | 1 | bslbf |
|   SPNProgramSequenceStart | 32 | uimsbf |
|   ProgramMapPID | 16 | uimsbf |
|   NumberOfStreamsInPS | 8 | uimsbf |
|   reserved | 8 | bslbf |
|   for (stream_index=0; stream_index<NumberOfStreamsInPS; stream_index++) { | | |
|     StreamPID[stream_index] | 16 | uimsbf |
|     blkStreamCodingInfo( stream_index) | | |
|   } | | |
| } | | |

Fig. 19

| SYNTAX | DATA LENGTH (BITS) | MNEMONIC |
|---|---|---|
| blkCPI() { | | |
|     Length | 32 | uimsbf |
|     if(Length !=0) { | | |
|         reserved | 12 | bslbf |
|         CPIType | 4 | bslbf |
|         blkEPMap() | | |
|     } | | |
| } | | |

Fig. 20

| SYNTAX | DATA LENGTH (BITS) | MNEMONIC |
|---|---|---|
| blkEPMap(){ | | |
|    reserved | 8 | bslbf |
|    NumberOfStreamPIDEntries | 8 | uimsbf |
|    for (k=0; k<NumberOfStreamPIDEntries; k++) { | | |
|       StreamPID[k] | 16 | bslbf |
|       reserved | 10 | bslbf |
|       EPStreamType[k] | 4 | bslbf |
|       NumberOfEPCoarseEntries[k] | 16 | uimsbf |
|       NumberOfEPFineEntries[k] | 18 | uimsbf |
|       EPMapForOneStreamPIDStartAddress[k] | 32 | uimsbf |
|    } | | |
|    for (i=0; i<X; i++) { | | |
|       padding_word | 16 | bslbf |
|    } | | |
|    for (k=0; k<NumberOfStreamPIDEntries; k++) { | | |
|       blkEPMapForOneStreamPID(EPStreamType[k], NumberOfEPCoarseEntries[k], NumberOfEPFineEntries[k]) | | |
|       for (i=0; i<Y[k]; i++) { | | |
|          padding_word | 16 | bslbf |
|       } | | |
|    } | | |
| } | | |

Fig. 21

| SYNTAX | DATA LENGTH (BITS) | MNEMONIC |
|---|---|---|
| blkEPMapForOneStreamPID(*EP_stream_type, Nc, Nf*) { | | |
|     EPFineTableStartAddress | 32 | uimsbf |
|     for (i=0; i<*Nc*; i++) { | | |
|     // EP coarse table | | |
|         RefToEPFineID*[i]* | 18 | uimsbf |
|         PTSEPCoarse*[i]* | 14 | uimsbf |
|         SPNEPCoarse*[i]* | 32 | uimsbf |
|     } | | |
|     for (i=0; i<X; i++) { | | |
|         padding_word | 16 | bslbf |
|     } | | |
|     for (*EP_fine_id* =0; *EP_fine_id* < *Nf*, *EP_fine_id*++) { | | |
|     // EP fine table | | |
|         ReservedEPFine*[EP_fine_id]* | 1 | bslbf |
|         IEndPositionOffset*[EP_fine_id]* | 3 | bslbf |
|         PTSEPFine*[EP_fine_id]* | 11 | uimsbf |
|         SPNEPFine*[EP_fine_id]* | 17 | uimsbf |
|     } | | |
| } | | |

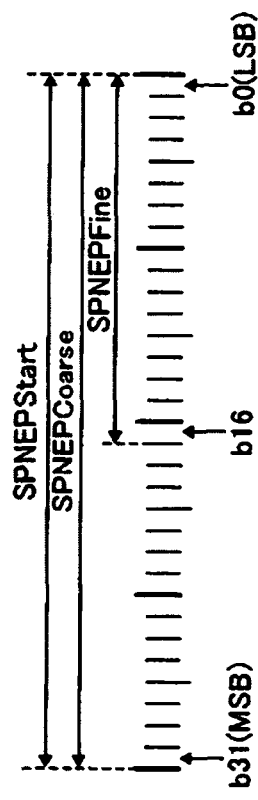

Fig. 24

| SYNTAX | DATA LENGTH (BITS) | MNEMONIC |
|---|---|---|
| blkExtensionData() { | | |
|   Length | 32 | uimsbf |
|   if(Length !=0){ | | |
|     DataBlockStartAddress | 32 | uimsbf |
|     reserved | 24 | |
|     NumberOfExtDataEntries | 8 | uimsbf |
|     for (i=0; i<*NumberOfExtDataEntries*; i++) { | | |
|       ext_data_entry() { | | |
|         ExtDataType | 16 | uimsbf |
|         ExtDataVersion | 16 | uimsbf |
|         ExtDataStartAddress | 32 | uimsbf |
|         ExtDataLength | 32 | uimsbf |
|       } | | |
|     } | | |
|     for (i=0; i<L1; i++) { | | |
|       padding_word | 16 | bslbf |
|       padding_word | 16 | bslbf |
|     } | | |
|     DataBlock() | 32 + 8 * (Length − DataBlockStartAddress) | |
|   } | | |
| } | | |

Fig. 28

| SYNTAX | DATA LENGTH (BITS) | MNEMONIC |
|---|---|---|
| blkIndexExtensionData(){ | | |
|     TypeIndicator | 8 * 4 | uimsbf |
|     reserved | 8 * 4 | bslbf |
|     TableOfPlayListsStartAddress | 32 | uimsbf |
|     MakersPrivateDataStartAddress | 32 | uimsbf |
|     reserved | 192 | bslbf |
|     blkUIAppInfoAVCHD() | | |
|     for(i=0; i<N1;i++) { | | |
|         padding_word | 16 | bslbf |
|     } | | |
|     blkTableOfPlayLists() | | |
|     for(i=0; i<N2;i++) { | | |
|         padding_word | 16 | bslbf |
|     } | | |
|     blkMakersPrivateData() | | |
|     for (i=0; i<N3;i++){ | | |
|         padding_word | 16 | bslbf |
|     } | | |
| } | | |

Fig. 29

| SYNTAX | DATA LENGTH (BITS) | MNEMONIC |
|---|---|---|
| blkTableOfPlayLists() { | | |
|     Length | 32 | uimsbf |
|     blkFirstPlaybackTitlePlayLists() | | |
|     blkMenuTitlePlayLists() | | |
|     NumberOfTitlePlayListPair | 16 | bslbf |
|     for(i=0; i< NumberOfTitlePlayListPair;i++){ | | |
|         blkMovieTitlePlayListPair() { | | |
|             PlayListFileName | 8 * 5 | bslbf |
|             reserved | 6 | bslbf |
|             PlayListAttribute | 2 | uimsbf |
|             reserved | 16 | bslbf |
|             RefToTitleId | 16 | uimsbf |
|         } | | |
|     } | | |
| } | | |

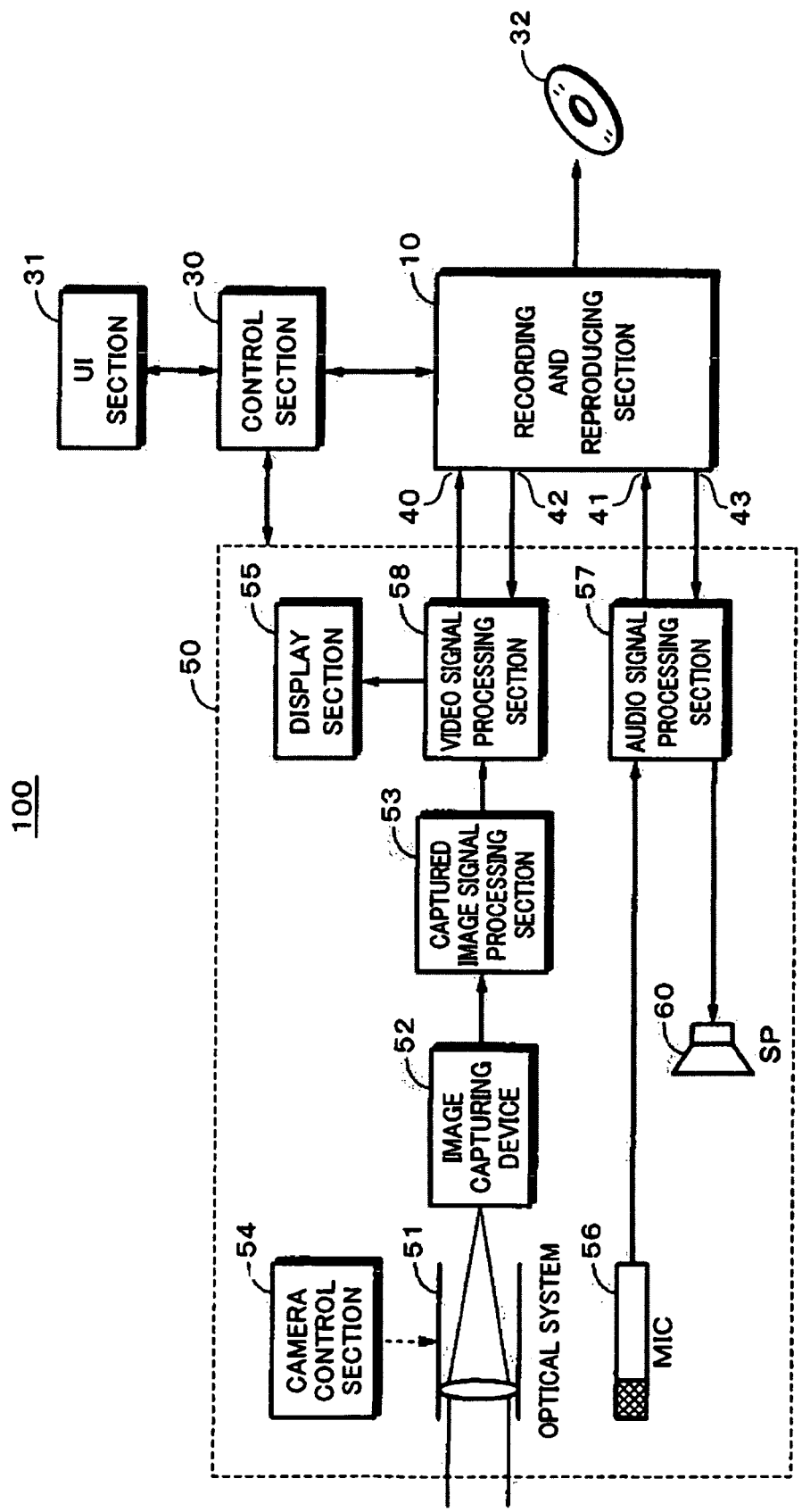

RECORDING APPARATUS, RECORDING METHOD, AND RECORDING PROGRAM, AND IMAGE CAPTURING APPARATUS, IMAGE CAPTURING METHOD, AND IMAGE CAPTURING PROGRAM

CROSS REFERENCE TO RELATED APPLICATIONS

The present application is a national phase entry under 35 U.S.C. §371 of International Application No. PCT/JP2007/065038 filed Jul. 25, 2007, published on Jan. 31, 2008 as WO 2008/013311 A1, which claims priority from Japanese Patent Application No. JP 2006-203038 filed in the Japanese Patent Office on Jul. 26, 2006.

TECHNICAL FIELD

The present invention relates to a recording apparatus, a recording method, and a recording program, and an image capturing apparatus, an image capturing method, and an image capturing program suitable for recording stream data of which video data and audio data have been multiplexed to a record medium.

BACKGROUND ART

In recent years, as a record medium that is recordable and removable from a recoding and reproducing apparatus, that has a relatively large recording capacity, and that is suitable for recording AV (Audio/Video) data composed of video data and audio data, a DVD (Digital Versatile Disc) having a recording capacity of 4.7 GB (Giga Byte) or more has become common. Patent document "Japanese Patent Application Laid-Open No. 2004-350251" describes an image capturing apparatus that records DVD-Video format data to a recordable type DVD.

Since this recordable type DVD uses the UDF (Universal Disk Format) as a file system, a UDF based computer can access this recordable type DVD. Since the UDF contains the ISO (International Organization for Standardization) 9660 based format, various types of file systems used for computer apparatus can access the recordable type DVD. When video data and audio data are recorded as a file to this recordable type DVD, since its affinity to other apparatus such as computer apparatus increases, recorded data can be more effectively used.

When video data and audio data are recorded as a file, various types of management information are created and recorded together with the video data and audio data to the record medium so as to easily reproduce the recorded video data and audio data.

As an example of management information, information that associates address information of a file of video data with time information can be contemplated (for convenience, this information is referred to as pointer information). With this pointer information as file management information, a desired reproduction position of video data stored in the file can be easily accessed.

As video data and audio data are recorded to the record medium, such management information is created, for example, by a CPU (Central Processing Unit) that controls, for example, a recording apparatus with a RAM (Random Access Memory) as a work memory. For example, while video data are being recorded, the CPU associates time information with address information of video data that are recorded and stores the associated information in the RAM. For example, when the record medium is ejected from the recording apparatus or the power OFF operation is performed for the recording apparatus, the management information stored in the RAM is read from the RAM and written to the record medium.

The management information is stored in the RAM and written to the record medium at timings when the record medium is ejected or the power OFF operation for the recording apparatus is performed. Thus, for example, when the power of the recording apparatus is unexpectedly stopped not through the normal power OFF procedure, a problem of which the management information stored in the RAM is lost occurs. When the management information is lost, it will become difficult to normally reproduce video data and audio data that have been recorded on the record medium.

As situations in which the power is unexpectedly stopped, it may be contemplated that the power cord is suddenly pulled out or the battery pack used as the power supply is abruptly dropped out. It is likely that these situations relatively easily occur in the normal use of the recording apparatus.

On the other hand, to prevent management information from being lost due to such an unexpected power stop, it can be contemplated that created management information is written to the record medium when the record stop operation is performed and the file that stores video data and audio data is closed. However, to write management information to the record medium, it takes a time to some extent. Thus, there is a problem of which even if the record start operation is tried immediately after the record stop operation, it is likely that the record start operation is not accepted.

This means that when the recording apparatus is, for example, a video camera apparatus that records an image captured by an image capturing device as video data to the record medium, an important image capturing timing will be lost.

DISCLOSURE OF THE INVENTION

Therefore, an object of the present invention is to provide a recording apparatus, a recording method, and a recording program, and an image capturing apparatus, an image capturing method, and an image capturing program that allow management information for video data and audio data created after their recording is started until their recording is stopped and they are recorded as a file to a record medium to be more securely stored.

To solve the foregoing problem, a first aspect of the present invention is in a recording apparatus which multiplexes video data and audio data and records the multiplexed video data and audio data to a record medium, characterized in that the recording apparatus comprises a data input section to which the video data and the audio data are input; a recording section which multiplexes the video data and the audio data and records a multiplexed stream as a stream file to the record medium; an information storing section which is capable of storing contents without power supplied from a system; a management information creating section which creates stream information which at least correlates reproduction time information of the stream file recorded on the record medium with address information thereof; and a control section which controls the recording section and the management information creating section, and the control section causes the information storing section to store first information which is contained in the stream information created by the management information creating section and which is created whenever record time for the stream file on the record medium by the recording section elapses according to a timing when the first information is created.

In addition, a second aspect of the present invention is in a recording method of multiplexing video data and audio data and recording the multiplexed video data and audio data to a record medium, characterized in that the recording method comprises a recording step of multiplexing the video data and the audio data that are input from an input section and recording a multiplexed stream as a stream file to the record medium; a management information creating step of creating stream information which at least correlates reproduction time information of the stream file recorded on the record medium with address information thereof; and a control step of controlling the recording step and the management information creating step, and the control step is performed by causing an information storing section which is capable of storing contents without power supplied from a system to store first information which is contained in the stream information created by the management information creating step and which is created whenever record time for the stream file on the record medium by the recording step elapses.

In addition, a third aspect of the present invention is in a recording program which causes a computer apparatus to execute a recording method of multiplexing video data and audio data and recording the multiplexed video data and audio data to a record medium, characterized in that the recording method comprises a recording step of multiplexing the video data and the audio data that are input from an input section and recording a multiplexed stream as a stream file to the record medium; a management information creating step of creating stream information which at least correlates reproduction time information of the stream file recorded on the record medium with address information thereof; and a control step of controlling the recording step and the management information creating step, and the control step is performed by causing an information storing section which is capable of storing contents without power supplied from a system to store first information which is contained in the stream information created by the management information creating step and which is created whenever record time for the stream file on the record medium by the recording step elapses.

In addition, a fourth aspect of the present invention is in an image capturing apparatus which multiplexes video data of a subject that has been captured by an image capturing section and audio data of a sound collected by a sound collecting section and records the multiplexed video data and audio data to a record medium, characterized in that the image capturing apparatus comprises the image capturing section which captures the subject and outputs the video data; the sound collecting section which collects the sound and outputs the audio data; a recording section which multiplexes the video data and the audio data and records a multiplexed stream as a stream file to the record medium; an operation section which accepts user's operations for a record start command and a record stop command for the video data and the audio data to the record medium; an information storing section which is capable of storing contents without a supply of power from a system; a management information creating section which creates stream information which at least correlates reproduction time information of the stream file recorded on the record medium with address information thereof; and a control section which controls an operation of the recording section according to a user's operation for the operation section and controls the management information creating section, and the control section causes the information storing section to store first information which is contained in the stream information created by the management information creating section and which is created whenever record time for the stream file on the record medium by the recording section elapses according to a timing when the first information is created.

In addition, a fifth aspect of the present invention is in an image capturing method for an image capturing apparatus which multiplexes video data of a subject that has been captured by an image capturing section and audio data of a sound collected by a sound collecting section and records the multiplexed video data and audio data to a record medium, characterized in that the image capturing method comprises a recording step of multiplexing the video data of the subject that has been captured by the image capturing section and the audio data of the sound collected by the sound collecting section and recording a multiplexed stream as a stream file to the record medium; a step of accepting user's operations for a record start command and a record stop command for the video data and the audio data to the record medium against an operation section; a management information creating step of creating stream information which at least correlates reproduction time information of the stream file recorded on the record medium with address information thereof; and a control step of controlling an operation of the recording step according to a user's operation for the operation section and controlling the management information creating step, and the control step is performed by causing an information storing section which is capable of storing contents without power supplied from a system to store first information which is contained in the stream information created by the management information creating step and which is created whenever record time for the stream file on the record medium by the recording step elapses.

In addition, a sixth aspect of the present invention is in an image capturing program which causes a computer program to execute an image capturing method for an image capturing apparatus which multiplexes video data of a subject that has been captured by an image capturing section and audio data of a sound collected by a sound collecting section and records the multiplexed video data and audio data to a record medium, characterized in that the image capturing method comprises a recording step of multiplexing the video data of the subject that has been captured by the image capturing section and the audio data of the sound collected by the sound collecting section and recording a multiplexed stream as a stream file to the record medium; a step of accepting user's operations for a record start command and a record stop command for the video data and the audio data to the record medium against an operation section; a management information creating step of creating stream information which at least correlates reproduction time information of the stream file recorded on the record medium with address information thereof; and a control step of controlling an operation of the recording step according to a user's operation for the operation section and controlling the management information creating step, and the control step is performed by causing an information storing section which is capable of storing contents without power supplied from a system to store first information which is contained in the stream information created by the management information creating step and which is created whenever record time for the stream file on the record medium by the recording step elapses.

As described above, according to the first, second, and third aspects of the present invention, video data and audio data that are input from an input section are multiplexed, a multiplexed stream is recorded as a stream file to a record medium, stream information which at least correlates reproduction time information of the stream file recorded on the record medium with address information thereof is created, and an information storing section which is capable of storing contents without power supplied from a system is caused to store first information which is contained in the stream information created and which is created whenever record time for the stream file on the record medium elapses according to a timing when the first information is created. Thus, even if power of the system is unexpectedly turned off, information which is contained in the stream information corresponding to the recorded stream file and which is created whenever record time for the stream file on the record medium elapses is not lost.

According to the fourth, fifth, and sixth aspects of the present invention, video data of a subject that has been captured by an image capturing section and audio data of a sound collected by a sound collecting section are multiplexed, a multiplexed stream is recorded as a stream file to a record medium, user's operations for a record start command and a record stop command for the video data and the audio data to the record medium are performed against an operation section, stream information which at least correlates reproduction time information of the stream file recorded on the record medium with address information thereof is created, and an information storing section which is capable of storing contents without power supplied from a system is caused to store the created stream information. Thus, even if power of the system is unexpectedly turned off, information which is contained in the stream information corresponding to the captured and recorded stream file and which is created whenever record time for the stream file on the record medium elapses is not lost.

According to the first, second, and third aspects of the present invention, as described above, video data and audio data that are input from an input section are multiplexed, a multiplexed stream is recorded as a stream file to a record medium, stream information which at least correlates reproduction time information of the stream file recorded on the record medium with address information thereof is created, and an information storing section which is capable of storing contents without power supplied from a system is caused to store the created stream information. Thus, there is provided an effect of which even if power of the system is unexpectedly turned off, information which is contained in the stream information corresponding to the recorded stream file and which is created whenever record time for the stream file on the record medium elapses is not lost.

According to the fourth, fifth, and sixth aspects of the present invention, as described above, video data of a subject that has been captured by an image capturing section and audio data of a sound collected by a sound collecting section are multiplexed, a multiplexed stream is recorded as a stream file to a record medium, user's operations for a record start command and a record stop command for the video data and the audio data to the record medium are performed against an operation section, stream information which at least correlates reproduction time information of the stream file recorded on the record medium with address information thereof is created, and an information storing section which is capable of storing contents without power supplied from a system is caused to store the created stream information. Thus, there is provided an effect of which even if power of the system is unexpectedly turned off, information which is contained in the stream information corresponding to the captured and recorded stream file and which is created whenever record time for the stream file on the record medium elapses is not lost.

BRIEF DESCRIPTION OF DRAWINGS

FIG. 6 is a schematic diagram showing syntax that represents an example of the structure of a file "index.bdmv";

FIG. 7 is a schematic diagram showing syntax that represents an example of the structure of a block blkIndexes( );

FIG. 8 is a schematic diagram showing syntax that represents an example of the structure of a file "MovieObject.bdmv";

FIG. 9 is a schematic diagram showing syntax that represents an example of the structure of a block blkMovieObjects( );

FIG. 10 is a schematic diagram showing syntax that represents an example of the structure of a play list file "xxxxx.mpls";

FIG. 11 is a schematic diagram showing syntax that represents an example of the structure of a block blkPlayList( );

FIG. 12 is a schematic diagram showing syntax that represents an example of the structure of a block blkPlayItem( );

FIG. 13A and FIG. 13B are schematic diagrams for describing first and second seamless connections, respectively;

FIG. 14 is a schematic diagram showing syntax that represents an example of the structure of a block blkPlayListMark( );

FIG. 15 is a schematic diagram showing syntax that represents an example of the structure of a clip information file;

FIG. 16 is a schematic diagram showing syntax that represents an example of the structure of a block blkClipInfo( );

FIG. 17 is a schematic diagram showing syntax that represents an example of the structure of a block blkSequenceInfo( );

FIG. 18 is a schematic diagram showing syntax that represents an example of the structure of a block blkProgramInfo( );

FIG. 19 is a schematic diagram showing syntax that represents an example of the structure of a block blkCPI( );

FIG. 20 is a schematic diagram showing syntax that represents an example of the structure of a block blkEPMap( );

FIG. 21 is a schematic diagram showing syntax that represents an example of the structure of a block blkEPMapForOneStreamPID(EP_stream_type, Nc, Nf);

FIG. 23 is a schematic diagram showing an example of the format of an entry SPNEPCoarse and an entry SPNEPFine;

FIG. 24 is a schematic diagram showing syntax that represents an example of the structure of a block blkExtensionData( );

FIG. 28 is a schematic diagram showing syntax that represents an example of the structure of a block DataBlock( ) of the field blkExtensionData( ) in the file "index.bdmv";

FIG. 29 a schematic diagram showing syntax that represents an example of the structure of a block blkTableOfPlayList( );

FIG. 35 is a block diagram showing an example of the structure of a video camera apparatus according to another example of an embodiment of the present invention.

BEST MODE FOR CARRYING OUT THE INVENTION

Next, with reference to accompanying drawings, an embodiment of the present invention will be described. For easy understanding, an example of a format applicable to the present invention will be described (hereinafter, referred to as the AVCHD format). The AVCHD format is currently being proposed as a record format of which an AV (Audio/Video) stream of which video data and audio data have been multiplexed in a predetermined manner is recorded to a recordable record medium. The AVCHD format allows an AV stream recorded on a record medium to be managed in the unit of one clip with a play list.

A bit stream that has been encoded, for example, according to the ITU-T (International Telecommunication Union—Telecommunication Standardization Sector) recommendation H.264 or the ISO (International Organization for Standardization)/IEC (International Electrotechnical Commission) International Standard 14496-10 (MPEG-4 part 10) Advanced Video Coding (hereinafter, referred to as the H.264|AVC) and that has been multiplexed according to the MPEG2 systems is referred to as a clip AV stream (or an AV stream). A clip AV stream is recorded as a file to a disc by a predetermined file system. This file is referred to as a clip AV stream file (or an AV stream file).

A clip AV stream file is a management unit on a file system. Thus, a clip AV stream file is not always a user-friendly management unit. To facilitate user-friendliness, it is necessary to provide a mechanism of continuously reproducing a plurality of clip AV stream files into which video contents are divided and a mechanism of partly reproducing a clip AV stream file and record information necessary to smoothly perform a special reproduction operation, a cue reproduction operation, and so forth as a database to a disc.

Figure 1:
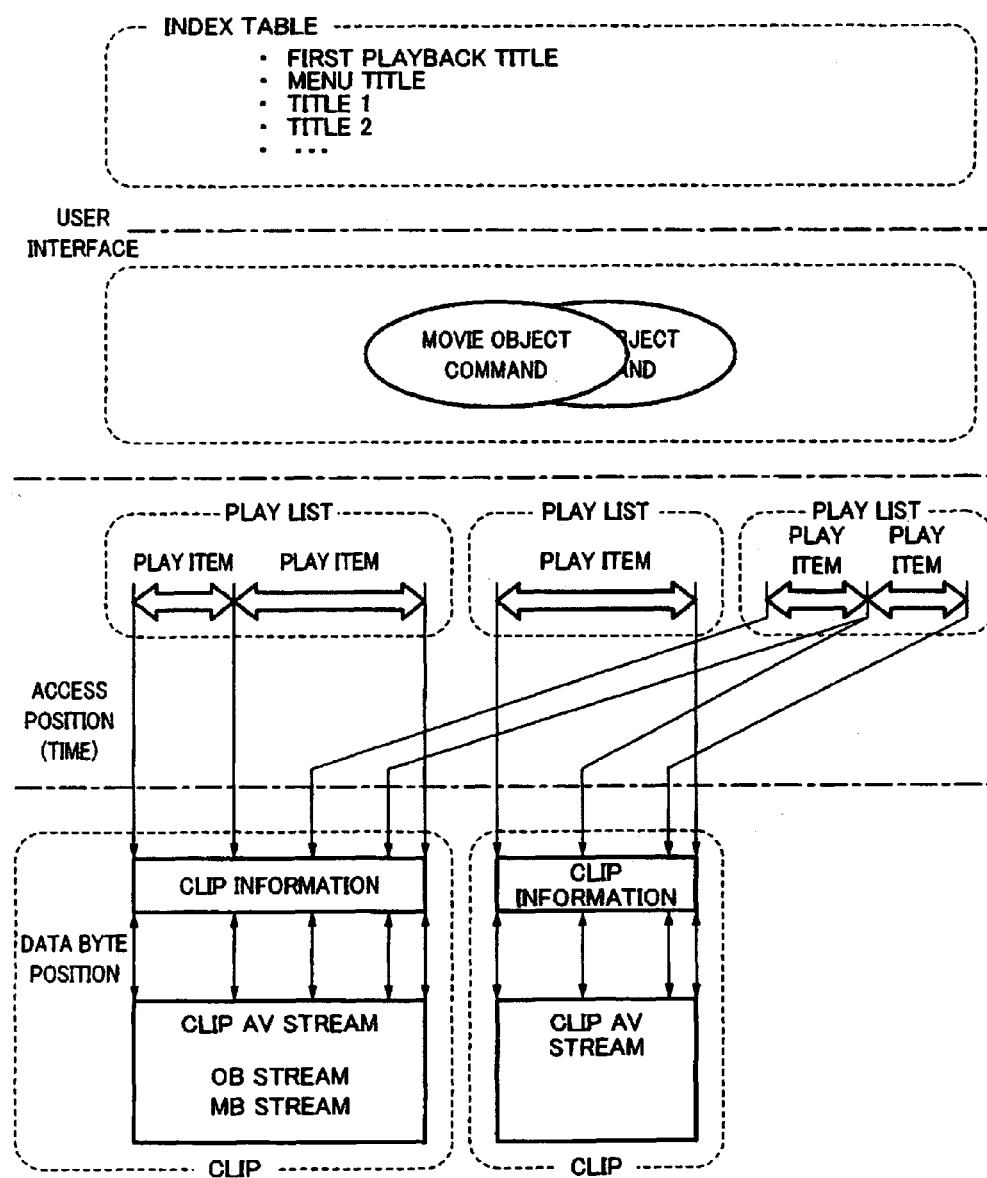
FIG. 1 is a schematic diagram showing an outline of a data model prescribed in the AVCHD format according to the present invention.

FIG. 1 shows an outline of a data model prescribed in the AVCHD format applicable to the present invention. As shown in FIG. 1, the AVCHD format has a data structure with four hierarchical layers. The lowest layer is a layer on which a clip AV stream is placed (for convenience, hereinafter, referred to as the clip layer). Placed above the clip layer is a layer for play lists (PlayList) with which reproduction positions of the clip AV stream are designated and play items (PlayItem) (for convenience, referred to as the play list layer). Placed above the play list layer is a layer for movie objects (Movie Object) each of which is composed of commands that designate the reproduction order of play lists and so forth (for convenience, referred to as the object layer). The highest layer is a layer for an index table with which titles and so forth stored on the record medium are managed (for convenience, referred to as the index layer).

Next, the clip layer will be described. A clip AV stream is a bit stream of which video data and audio data have been multiplexed, for example, according to the MPEG2 TS (transport stream) format. Information about the clip AV stream is recorded as clip information (Clip Information) in a file.

In addition, an OB stream (Overlay Bitmap stream) that is a graphic stream for a subtitle and an MB stream (Menu Bitmap stream) as a stream of data (such as button image data) for a menu indication can be multiplexed with a clip AV stream.

A pair of a clip AV stream file and a clip information file in which clip information corresponding to the clip AV stream file has been recorded (hereinafter, referred to as a clip information file) is treated as an object and referred to as a clip (Clip). In other words, a clip is one object composed of a clip AV stream and clip information.

A file is generally treated as a sequence of bytes. Contents of a clip AV stream file are mapped on the time base. An entry point of a clip is mainly designated on the time base. When a time stamp of an access point is given to a predetermined clip, a clip information file can be used to find address information with which data are read from the clip AV stream file.

Next, the play list layer will be described. A play list designates an AV stream file to be reproduced. A play list is composed of pairs of a reproduction start point (IN point) and a reproduction end point (OUT point) with which a reproduction position of a designated AV stream file is designated. A pair of the reproduction start point and the reproduction end point is referred to as a play item (PlayItem). A play list is composed of a set of play items. When a play item is reproduced, a part of an AV stream file referred from the play item is reproduced. In other words, a region of a clip is reproduced on the basis of information of an IN point and an OUT point of a play item.

Next, the object layer will be described. A movie object contains a navigation command program and terminal information that is associated with the movie object. The navigation program is a command (navigation command) for controlling the reproduction of a play list.

Next, the index layer will be described. The index layer is composed of an index table (Index Table). The index table is a table in the top level that defines titles of contents recorded on a disc. A module manager of player resident system software controls the reproduction of data of the record medium on the basis of title information stored in the index table.

Figure 2:
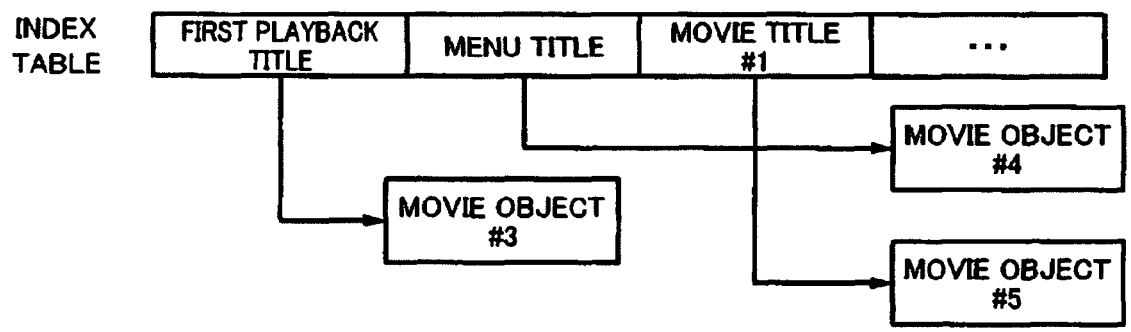
FIG. 2 is a schematic diagram for describing an index table.

In other words, as schematically shown in FIG. 2, any entries in the index table are referred to as titles. All of a first playback title (First PlaybackTitle), a menu title (MenuTitle), and movie title (MovieTitle) #1, #2, and so forth that are entries in the index table are titles. Each title represents a link to a movie object.

For easy understanding, for example, in a reproduction-only record medium, when contents stored in this record medium are a movie, the first playback title corresponds to an advertisement picture of a movie maker, which is followed by the main body of the movie. When contents are a movie, the menu title corresponds to a menu screen with which operations for which the main body is reproduced, a chapter is searched, a subtitle and a language are set, and a bonus picture is reproduced are selected. The movie titles are pictures selected from the menu title. A title may be structured as a menu screen.

Figure 3:
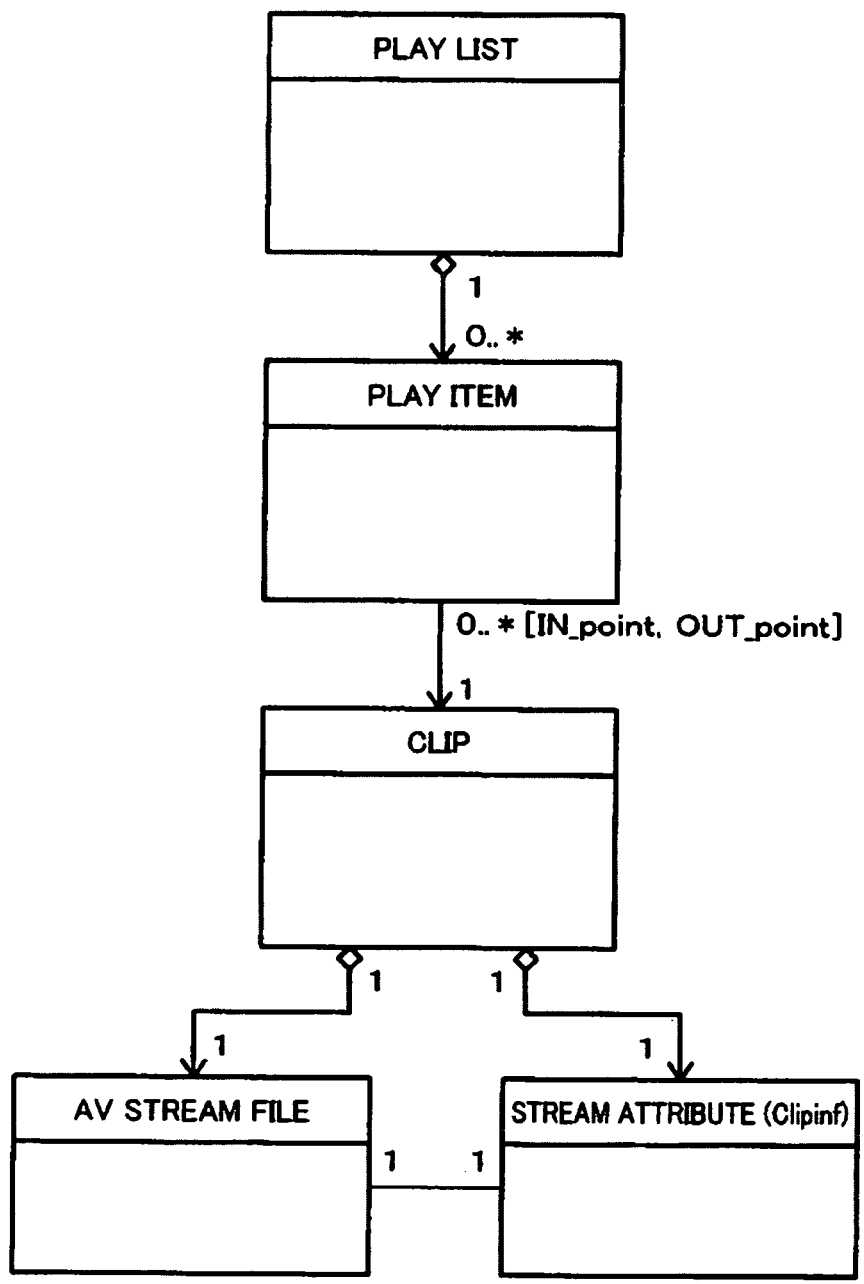
FIG. 3 is an UML diagram showing the relationship of a clip AV stream, clip information, a clip, a play item, and a play list.

FIG. 3 is a UML (unified Modeling Language) diagram showing the relationship of the foregoing clip AV stream, clip information (Stream Attributes), a clip, a play item, and a play list. A play list is correlated with one or a plurality of play items. A play item is correlated with one clip. One clip can be correlated with a plurality of play items whose start point and/or end point different from each other. One clip refers to one clip AV stream file. Likewise, one clip refers to one clip information file. A clip AV stream file and a clip information file have a relationship of one to one. With such a structure, the reproduction order can be non-destructively designated to reproduce only a desired portion of a clip AV stream file without necessity of changing it.

Figure 4:
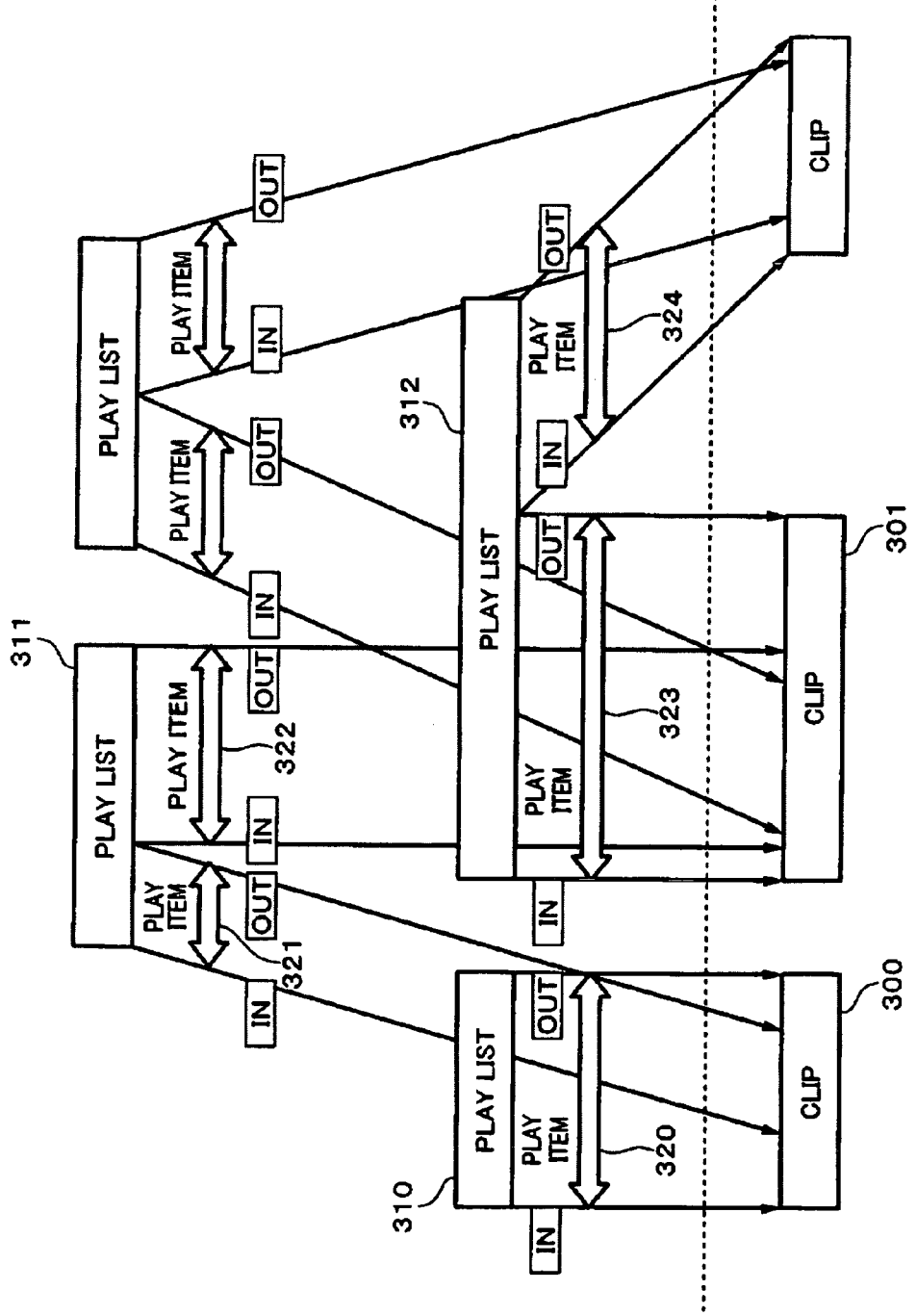
FIG. 4 is a schematic diagram for describing a method of referring to the same clip from a plurality of play lists.

In addition, as shown in FIG. 4, the same clip can be referred from a plurality of play lists. In addition, a plurality of clips can be designated from one play list. A clip is referred with an IN point and an OUT point of a play item in a play list. In the example shown in FIG. 4, a clip 300 is referred from a play item 320 of a play list 310. In addition, the clip 300 is referred for a region designated by an IN point and an OUT point of a play item 321 of a play list 311 that has the play item 321 and a play item 322. In addition, a clip 301 is referred for a region designated by an IN point and an OUT point of the play item 322 of the play list 312. In addition, the clip 301 is referred for a region designated by an IN point and an OUT point of a play item 323 of a play list 312 that has the play item 323 and a play item 324. In the example shown in FIG. 4, the clip 301 is also referred from another play list.

Figure 5:
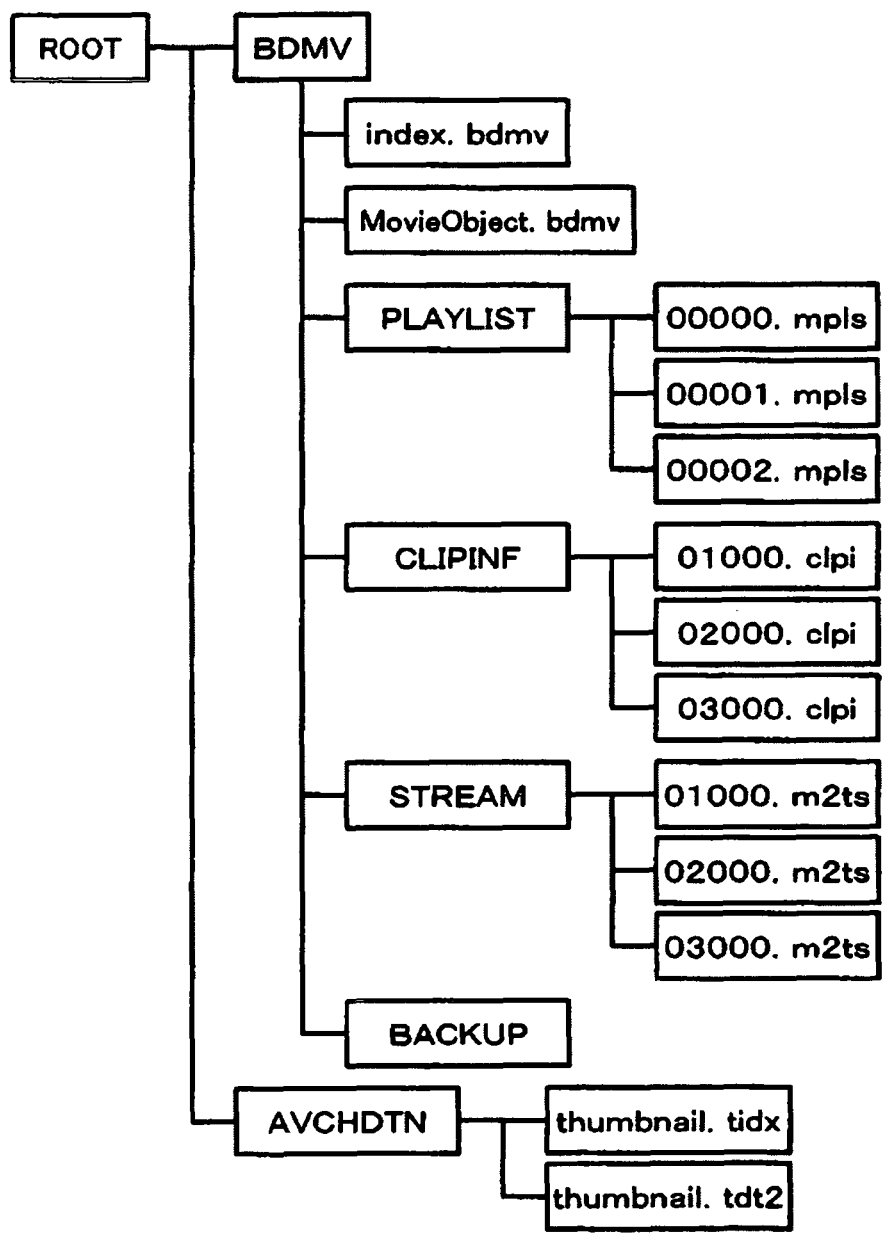
FIG. 5 is a schematic diagram for describing a management structure of files recorded on a record medium.

Next, with reference to FIG. 5, the management structure for files in the AVCHD format on a record medium will be described. Files are hierarchically managed with a directory structure. One directory (in FIG. 5, a root directory) is created on a record medium. Below the directory is the range managed by one recoding and reproducing system.

Placed below the root directory is a directory "BDMV". When necessary, placed below the root direction is a directory "AVCHDTN". Placed in the directory "AVCHDTN" are thumbnail files of which representative images of clips have been reduced in a predetermined size. Placed in the directory "BDMV" is the data structure described with reference to FIG. 1.

Placed immediately below the directory "BDMV" are only two files, a file "index.bdmv" and a file "MovieObject.bdmv". Placed below the directory "BDMV" are a directory "PLAYLIST", a directory "CLIPINF", a directory "STREAM", and a directory "BACKUP". The directory "BACKUP" stores backups of individual directories and files.

The file "index.bdmv" describes the contents of the directory "BDMV". In other words, this file "index.bdmv" corresponds to the index table in the index layer, which is the foregoing highest layer. The file "MovieObject.bdmv" stores information about at least one movie object. In other words, this file "MovieObject.bdmv" corresponds to the foregoing object layer.

The directory "PLAYLIST" is a directory in which the database of play lists is placed. In other words, the directory "PLAYLIST" contains a file "xxxxx.mpls" that is a file with respect to a play list. The file "xxxxx.mpls" is a file created for each play list. In the file name, "xxxxx" followed by a "•" (period) is a five-digit numeral. "mpls" preceded by the period is a fixed extension of a file of this type.

The directory "CLIPINF" is a directory in which a database of clips is placed. In other words, the directory "CLIPINF" contains a file "zzzzz.clpi" that is a clip information file corresponding to a clip AV stream file. In the file name, "zzzzz" followed by a "•" (period) is a five-digit numeral. "clpi" preceded by the period is a fixed extension of a file of this type.

The directory "STREAM" is a directory in which an AV stream file as an entity is placed. In other words, the directory "STREAM" contains a clip AV stream file corresponding to a clip information file. A clip AV stream file is composed of an MPEG2 (Moving Pictures Experts Group 2) transport stream (hereinafter abbreviated as an MPEG2 TS). The file name of a clip AV stream file is "zzzzz.m2ts". When "zzzzz" followed by the period of the file name of the clip AV stream file is the same as that of the corresponding clip information file, their relationship can be easily recognized.

Two types of thumbnail files thumbnail.tidx and thumbnail.tdt2 can be placed in the directory "AVCHDTN". The thumbnail file thumbnail.tidx stores a thumbnail image that has been encrypted in a predetermined system. In contrast, the thumbnail file thumbnail.tdt2 stores a thumbnail image that has not been encrypted. Since it is likely that a thumbnail image corresponding to a clip that the user has captured, for example, with a video camera is copy-free, this thumbnail image is stored in thumbnail file thumbnail.tdt2.

Next, among files shown in FIG. 5, those that strongly relate to the present invention will be described in more detail. First of all, the file "index.bdmv", which is placed immediately below the directory "BDMV", will be described. FIG. 6 shows syntax that represents an example of the structure of the file "index.bdmv". In this example, syntax is represented according to syntax of the C language, which is used as a programming language for computer devices and so forth. This applies to drawings that show syntax of other files.

In FIG. 6, a field TypeIndicator has a data length of 32 bits and denotes that this file is an index table. A field TypeIndicator2 has a data length of 32 bits and represents the version of the file "index.bdmv". A field "IndexesStartAddress" has a data length of 32 bits and represents the start address of a block blkIndexes( ) in this syntax.

A field ExtensionDataStartAddress has a data length of 32 bits and represents the start address of a block blkExtensionData( ) in this syntax. The block blkExtensionData( ) is a block that can store predetermined extension data. The field ExtensionDataStartAddress represents the start address of the block blkExtensionData( ) as the relative number of bytes from the beginning of bytes of this file "index.bdmv". The relative number of bytes starts with "0". If the value of the field ExtensionDataStartAddress is "0", it denotes that this file "index.bdmv" does not contain the block blkExtensionData( ).

The field ExtensionDataStartAddress is followed by an area reserved that has a data length of 192 bytes. The area reserved is an area reserved for a byte alignment, a future field addition, and so forth. This applies to the description that follows. A block blkAppInfoBDMV( ) is a block in which the contents creator can describe any information and does not affect the operation of the player and so forth.

A block blkIndexes( ) is substantial contents of this file "index.bdmv". The contents described in this block blkIndexes( ) designate the first playback reproduced when the disc is loaded into the player, and a title (a movie object) that is called from the top menu. A play list file (that will be described later) is read according to a command described in a movie object or the like called by an index table.

FIG. 7 shows syntax that represents an example of the structure of the block blkIndexes( ). A field Length has a data length of 32 bits and represents the data length immediately after this field Length until the end of this block blkIndexes( ). The field Length is followed by a block FirstPlaybackTitle( ) and a block MenuTitle( ).

The block FirstPlaybackTitle( ) describes information about an object used in the first playback. The block FirstPlaybackTitle( ) describes an area reserved having a data length of 1 bit, followed by a fixed value "1". The block FirstPlaybackTitle( ) further describes a fixed value "1" through an area reserved having a data length of 31 bits. Followed by an area reserved having a data length of 14 bits, a field FirstPlaybackTitleMobjIDRef having a data length of 16 bits is placed. This field FirstPlaybackTitleMobjIDRef represents the ID of a movie object used in the first playback title.

The ID of a movie object is represented by a value mobj_id used as a loop variable in a for loop statement of a movie object based on syntax of a movie object that will be described later, for example, with reference to FIG. 8 and FIG. 9. In this example, the field FirstPlaybackTitleMobjIDRef stores a value mobj_id corresponding to a movie object to be referred.

The field FirstPlaybackTitleMobjIDRef of the block FirstPlaybackTitle( ) in the block blkIndexes( ) may represent a movie object of the top menu or a title.

The block MenuTitle( ) describes information about an object used in the top menu. The block MenuTitle( ) describes an area reserved having a data length of 1 bits, followed by a fixed value "1". Followed by an area reserved having a data length of 31 bits, a fixed value "1" is described. In addition, followed by an area reserved having a data length of 14 bits, a field MenuTitleMobjIDRef having a data length of 16 bits is placed. The field MenuTitleMobjIDRef represents the ID of a movie object used in the menu title.

The block MenuTitle( ) is followed by a field NumberOfTitles that has a data length of 16 bits and that represents the number of titles that the user can select and that can be reproduced. According to the next for loop statement, the number of times represented by this field NumberOfTitles, a block MovieTitle[title_id]( ) is described with an argument of a value title_id. The block MovieTitle[title_id]( ) describes information of each title. The value title_id is a numeric value from "0" to a value represented by the field NumberOfTitles and identifies a title.

In the block MovieTitle[title_id]( ), followed by an area reserved having a data length of 1 bit, a fixed value "1" is described. In addition, followed by an area reserved having a data length of 46 bits, a field MovieTitleMobjIDRef is described. The field MovieTitleMobjIDRef has a data length of 16 bits and represents the ID of a movie object used in this title. The field MovieTitleMobjIDRef is followed by an area reserved having a data length of 32 bits.

FIG. 8 shows syntax that represents an example of the structure of the file "MovieObject.bdmv" placed immediately below the directory "BDMV". A field type_indicator has a data length of 32 bits (4 bytes) and denotes that this file is the file "MovieObject.bdmv". The field TypeIndicator describes a four-letter character string encoded according to an encoding system prescribed in the ISO (International Organization for Standardization) 646. In the example shown in FIG. 8, the field TypeIndicator describes a four-letter character string "MOBJ" encoded according to a system prescribed in the ISO 646 and denotes that this file is the file "MovieObject.bdmv".

A field TypeIndicator2 has a data length of 32 bits (4 bytes) and represents the version number of this file "MovieObject.bdmv". In this file "MovieObject.bdmv", the field TypeIndicator2 should be four-letter character string "0100" encoded according to an encoding-system prescribed in the ISO 646.

A field ExtensionDataStartAddress has a data length of 32 bits and represents the start address of blkExtensionData( ) in this syntax. The field ExtensionDataStartAddress represents the start address of the block blkExtensionData( ) as the relative number of bytes from the beginning of bytes of this file "MovieObject.bdmv". The relative number of bytes starts with "0". If the value of this field ExtensionDataStartAddress is "0", it denotes that the block blkExtensionData( ) does not exist in the file "MovieObject.bdmv".

A field padding_word in syntax shown in FIG. 8 has a data length of 16 bits. According to syntax of this file "MovieObject.bdmv", the field padding_word is inserted the number of times represented by a value N1 or a value N2 into a for loop statement. The value N1 or the value N2 is "0" or any positive integer. As the field padding_word, any value can be used.

Followed by the field ExtensionDataStartAddress, an area reserved having a data length of 224 bits is placed. Thereafter, a block blkMovieObjects( ) that is the main body of this file "MovieObject.bdmv" is stored.

FIG. 9 shows syntax that represents an example of the structure of the block blkMovieObjects( ). A field Length has a data length of 32 bits and represents the data length immediately after this field Length until the end of this block blkMovieObjects( ). Followed by an area reserved having a data length of 32 bits, a field NumberOfMobjs is placed. The field NumberOfMobjs represents the number of movie objects stored according to a for loop statement immediately preceded by the field NumberOfMobjs. A movie object is uniquely identified by a value mobj_id used as a loop variable of the for loop statement. The value mobj_id starts with "0". Movie objects are defined in the order described in the for loop statement.

A block TerminalInfo( ) in the for loop statement describes a fixed value "1", followed by an area reserved having a data length of 15 bits. Thereafter, a field NumberOfNavigationCommands[mobj_id] having a data length of 16 bits is placed. This field NumberOfNavigationCommands[mobj_id] represents the number of navigation commands (NavigationCommand) contained in a movie object MovieObject[mobj_id]( ) represented by a value mobj_id.

According to a for loop statement with a loop variable of value command_id, navigation commands are described for the number represented by a field NumberOfNavigationCommands [mobj_id]. In other words, the field NavigationCommand[mobj_id][command_id] placed in this for loop statement contains navigation commands NavigationCommand's in the order represented by a value command_id contained in a block MovieObject[mobj_id]( ) represented by a value mobj_id. The value command_id starts with "0". The navigation commands NavigationCommand's are defined in the order described in this for loop statement.

FIG. 10 shows syntax that represents an example of the structure of a play list file "xxxxx.mpls". A field TypeIndicator has a data length of 32 bits (4 bytes) and denotes that this file is a play list file. A field TypeIndicator2 has a data length of 32 bits (4 bytes) and represents the version of this play list file. A field PlayListStartAddress has a data length of 32 bits and represents the start address of a block blkPlayList( ) in this syntax.

A field PlayListMarkStartAddress has a data length of 32 bits and represents the start address of a block blkPlayListMark( ) in this syntax. A field ExtensionDataStartAddress has a data length of 32 bits and represents the start address of a block blkExtensionData( ) in this syntax. The field Extension- DataStartAddress represents the start address of a block blkExtensionData( ) as the relative number of bytes from the beginning of bytes of the file "xxxxx.mpls". The relative number of bytes starts with "0". If the value of the field ExtensionDataStartAddress is 0, it denotes that the block blkExtensionData( ) does not exist in this file "xxxxx.mpls".

Followed by an area reserved having a data length of 160 bits, a block blkAppInfoPlayList( ) is placed. The block blkAppInfoPlayList( ) describes information such as the type and reproduction restrictions of a play list described in the next block blkPlayList( ). The block blkPlayList( ) describes a play list. The block blkPlayListMark( ) describes a point to be jumped as in a chapter jump. The block blkExtensionData( ) is a block that can store predetermined extension data.

A field padding_word in syntax shown in FIG. 10 has a data length of 16 bits. According to syntax of this file "xxxxx.mpls", the field padding-word is inserted the number of times represented by a value N1, a value N2 and a value N3 into a for loop statement. The value N1, the value N2, or the value N3 is "0" or any positive integer. As the field padding_word, any value can be used.

FIG. 11 shows syntax that represents an example of the structure of the block blkPlayList( ). A field Length has a data length of 32 bits and represents the data length immediately after this field Length until the end of the block blkPlayList( ). The field Length is followed by an area reserved having a data length of 16 bits, followed by a field NumberOfPlayItems. The field NumberOfPlayItems has a data length of 16 bits and represents the number of play items contained in this block blkPlayList( ). A field NumberOfSubPath represents the number of sub paths contained in this block blkPlayList( ).

According to the next for loop statement, blocks blkPlayItem( )'s that describe a play item are described for the number represented by the field NumberOfPlayItems. A count value based on the for loop statement becomes an identifier PlayItem_id of a block blkPlayItem( ). According to the next for loop statement, blocks blkSubPath( )'s are described for the number represented by the field NumberOfSubPath. A count value based on the for loop statement becomes an identifier SubPath_id of a block blkSubPath( ).

A sub path can be provided corresponding to a sub play item while a main path is provided corresponding to a play item that is mainly reproduced. A sub path can be used to designate for example audio data for after-recording, and a sub image to be reproduced in synchronization with a clip designated in a play item.

FIG. 12 shows syntax that represents an example of the structure of a block blkPlayItem( ). A field Length has a data length of 16 bits and represents the data length immediately after this field Length until the end of the block blkPlayItem( ).

A field ClipInformationFileName has a data length of 40 bits (5 bytes) and represents the file name of a clip information file to which this block blkPlayItem( ) refers. In this play item, a clip information file having a filename represented by the field ClipInformationFileName is read. A field ClipCodecIdentifier[0] has a data length of 32 bits (4 bytes) and represents the codec system of a clip AV stream used in this play item in this block blkPlayItem( ).

Followed by an area reserved having a data length of 12 bits, a field ConnectionCondition is placed. The field ConnectionCondition has a data length of 4 bits and represents information about a connection state of clips. For recordable record mediums, as the value of the field ConnectionCondition, "1", "5", or "6" is used. When the value of the field ConnectionCondition is "1", it denotes that a clip referred from the current play item and a clip referred from the immediately earlier play item are not seamlessly connected. When the value of the field ConnectionCondition is "5" or "6", it denotes that a clip referred from the current play item and a clip referred from the immediately earlier play item are seamlessly connected. The term "seamlessly connected" means that the reproduction of clips is controlled such that one clip and the next clip are successively reproduced at frame timings.

When the value of the field ConnectionCondition is "5", the recording length of audio data of a clip to which the current play item refers is longer than the recording length of video data thereof (refer to FIG. 13A). Thus, when clips are connected, a fade-out process for audio data can be performed. For example, when a clip is closed by a user's record stop operation, the value of the field ConnectionCondition is "5". Hereinafter, the clip connection method of which the value of the field ConnectionCondition is "5" is referred to as the first seamless connection.

When the value of the field ConnectionCondition is "6", the recording length of audio data of a clip to which the current play item refer is the same as the recording length of video data thereof (refer to FIG. 13B). Thus, clips can be seamlessly connected. For example, when a clip is closed due to a cause of the system other than a user's record stop operation, the value of the field ConnectionCondition is "6". Hereinafter, the clip connection method of which the value of the field ConnectionCondition is referred to as the second seamless connection.

A field RefToSTCID[0] has a data length of 8 bits and represents information about a discontinuous point of a system timebase (STC). A field INTime and a field OUTTime each have a data length of 32 bits and represent the reproduction range of a main clip AV stream. The field INTime represents a start point (IN point), whereas the field OUTTime represents an end point (OUT point).

A block blkUOMaskTable( ) is a table in which an acceptance restriction for a user's input is set. A flag PlayItemRandomAccessFlag that has a data length of 1 bit prescribes permission/restriction of random access for the play item of this block blkPlayItem( ). Thereafter, followed by an area reserved having a data length of 7 bits, a field StillMode is placed. The field StillMode has a data length of 8 bits and denotes whether or not the last picture of the play item in the block blkPlayItem( ) is displayed as a still image. When the value of the field StillMode is "0x01" (binary), a field StillTime that has a data length of 16 bits represents a still time based on an if statement. When the value of the field StillMode is not "0x01", an area having a data length of 16 bits is reserved.

A numeric value with "0x" denotes that it is expressed in hexadecimal notation. This applies to the similar notation.

A block blkSTNTable( ) manages an attribute of the clip AV stream, PID number, record position on the record medium, and so forth that the play item of this block blkPlayItem( ) manages.

FIG. 14 shows syntax that represents an example of the structure of a block blkPlayListMark( ). A field Length has a data length of 32 bits and represents the data length immediately after this field Length until the end of the block blkPlayListMark( ).

A field NumberOfPlayListMark has a data length of 16 bits and represents the number of play list marks contained in this block blkPlayListMark( ). According to the next for loop statement, information of play list marks for the number represented by the field NumberOfPlayListMarks is described.

In the for loop statement, followed by an area reserved having a data length of 8 bits, a field MarkType is placed. The field MarkType has a data length of 8 bits and represents the type of a mark. Play list marks are defined as two types of marks that are an entry mark (Entry Mark) and a link point (Link Point). This field MarkType represents one of these types. To define a chapter, an entry mark is used. Since link points less relate to the present invention, its description will be omitted. The foregoing field NumberOfPlayListMarks represents the total value of entry marks and link points.

A field RefToPlayItemID has a data length of 16 bits and describes identification information PlayItem_id that represents a play item to which a mark is placed. A field MarkTimeStamp has a data length of 32 bits and describes a time stamp that represents a point to which a mark is placed. A field EntryESPID has a data length of 16 bits and represents the value of the PID of a TS packet that contains an elementary stream represented by a mark. A field Duration is an unsigned integer that has a data length of 32 bits and that represents a measured result in the unit of a 45 kHz clock. When the value stored in this field Duration is "0", this field is meaningless.

FIG. 15 shows syntax that represents an example of the structure of a clip information file. A field TypeIndicator has a data length of 32 bits (4 bytes) and denotes that this file is a clip information file. A field TypeIndicator2 has a data length of 32 bits (4 bytes) and represents the version of this clip information file.

This clip information file has a block blkClipInfo( ), a block blkSequenceInfo( ), a block blkProgramInfo( ), a block blkCPI( ), a blockblkClipMark( ), and a block blkExtensionData( ). A field SequenceInfoStartAddress, a field ProgramInfoStartAddress, a field CPIStartAddress, a field ClipMarkStartAddress, and a field ExtensionDataStartAddress each have a data length of 32 bits and represent the start address of their corresponding block.

The field ExteensionDataStartAddress represents the start address of the block blkExtensionData( ) as the relative number of bytes from the beginning of bytes of this clip information file. The relative number of bytes starts with "0". If the value of this field ExtensionDataStartAddress is "0", it denotes that the block blkExtensionData( ) does not exist in this file "index.bdmv".

The block blkClipInfo( ) after an area reserved having a data length of 96 bits preceded by the fields that represents their start address. The block blkClipInfo( ) describes information about a clip AV stream that this clip information file manages. The block blkSequenceInfo( ) describes information with which sequences having continuous STCs and ATCs (arrival time base) are managed as one sequence. The block blkProgramInfo( ) describes information, for example, about the encoding system and aspect ratio of the clip AV stream managed in this clip information file. The block blkCPI( ) stores information, for example, about characteristic point information CPI that represents characteristic points such as a random access start point in the AV stream.

The block blkClipMark( ) describes an index point (jump point) such as a chapter position added to a clip for a cue operation. The block blkExtensionData( ) is an area that can store extension data. Since the block blkClipMark( ) and the block blkExtensionData( ) in the clip information file less relate to the present invention, their description will be omitted.

FIG. 16 shows syntax that represents an example of the structure of a block blkClipInfo( ). A field Length has a data length of 32 bits and represents the data length immediately after this field Length until the end of the block blkClipInfo( ). Followed by an area reserved having a data length of 16 bits, a field ClipStreamType is placed.

The field ClipStreamType has a data length of 8 bits and represents the type of a clip AV stream. The value of this field ClipStreamType is fixed, for example, "1". A field ApplicationType has a data length of 8 bits and denotes how a clip AV stream (a file having an extension "m2ts") has been multiplexed. When the value of the field ApplicationType is "1", the corresponding clip AV stream is reproduced as a regular moving picture. The field ApplicationType is followed by an area reserved having a data length of 31 bits.

A flag IsCC5 has a data length of 1 bit and denotes whether or not the corresponding clip and the next clip are connected by the foregoing first seamless connection, namely the method of which the value of the field ConnectionCondition is "5" with the block blkPlayItem( ) of the play list. When the value of the flag IsCC5 is "1", (binary value), it denotes that clips are connected by the first seamless connection.

A field TSRecordingRate represents the recording rate of a clip AV stream file in the unit of bytes/second. A field NumberOfSourcePackets represents the number of source packets contained in a clip AV stream. Followed by an area reserved having a data length of 1024 bits, a block TSTypeInfoBlock( ) is placed. The block TSTypeInfoBlock( ) stores information that represents the type of packets that store a clip AV stream. Since this block TSTypeInfoBlock( ) less relates to the present invention, its detailed description will be omitted.

When the value of the foregoing flag IsCC5 is "1", followed by an if statement, information is described. Followed by an area reserved having a data length of 8 bits after the if statement, a field FollowingClipStreamType is placed. The field FollowingClipStreamType has a data length of 8 bits and represents the type of a clip preceded by the clip corresponding to the clip information file. Followed by an area reserved having a data length of 32 bits, a field FollowingClipInformaionFileName is placed.

The field FollowingClipInformaionFileName has a data length of 40 bits and describes the file name of the clip information file corresponding to the next clip of the clip corresponding to this clip information file. The next field ClipCodecIdentifier has a data length of 32 bits (4 bytes) and represents the encoding system of the next clip. In this example, the field ClipCodecIdentifier is a fixed four-letter character string "M2TS" encoded according to a system prescribed in the ISO 646. Next, an area reserved having a data length of 8 bits is placed.

FIG. 17 shows syntax that represents an example of the structure of a block blkSequenceInfo( ). A field Length has a data length of 32 bits and represents the data length immediately after this field Length until the last end of the block blkSequenceInfo( ). Followed by an area reserved having a data length of 15 bits, fixed value "1" having a data length of 1 bits is described.

The next field SPNATCStart has a data length of 32 bits and represents the start of a sequence that denotes that data were recorded in continuous times (referred to as the sequence ATCSequence) with a packet number. In this example shown in FIG. 17, the field SPNATCStart has value "0" that denotes that the beginning of the sequence matches that of the clip AV stream file. A field NumberOfSTCSequence represents the number of sequences STCSequence's of the sequence ATCSequence. The field NumberOfSTCSequence has a value equal to or larger than "1".

According to the next for loop statement, information of the sequences STCSequence is described for the number of entries represented by the field NumberOfSTCSequence. The sequence STCSequence represents a range of which PCRs (Program Clock References) on which the time base of the MPEG2 TS (Transport Stream) is based are continuous. A number STC_id that is unique in a clip is assigned to the sequence STCSequence. In this sequence STCSequence, since a consistent time base that is not discontinuous can be defined, the start time and the end time of a play item can be uniquely defined. In other words, the start time and the end time of each play item need to exist in the same sequence STCSequence. In this for loop statement, the value stc_id designates the sequence STCSequence.

A field PCRPID[stc_id] has a data length of 16 bits and represents the PID of a TS packet that contains a PCR (Program Clock Reference) in the MPEG2 TS. A field SPNSTC-Start[stc_id] has a data length of 32 bits and represents the start of the sequence STCSequence with a packet number. A field PresentationStartTime and a field PresentationEndTime each have a data length of 32 bits and represents a range effective in the clip AV stream. The range represented by the field PresentationStartTime and the field PresentationEnd-Time is a range that can be referred from a play item.

FIG. 18 shows syntax that represents an example of a block blkProgramInfo( ). A field Length has a data length of 32 bits and represents the data length immediately after this field Length until the last end of the block blkProgramInfo( ). Followed by an area reserved having a data length of 15 bits, a fixed value "1" having a data length of 1 bit is described.

A field SPNProgramSequenceStart has a data length of 32 bits and describes a source packet number with which the program sequence starts in the corresponding clip AV stream file starts. A field ProgramMapPID has a data length of 16 bits and represents the value of the PID of a TS packet that likely contains a program map section according to the program sequence. A field NumberOfStreamInPS has a data length of 8 bits and represents the number of elementary streams defined in the program sequence. Followed by the field NumberOfStreamInPS, an area reserved having a data length of 8 bits is placed.

According to the next for loop statement, with a value [stream_index] as a loop variable, pairs of a field StreamPID [stream_index] and a block blkStreamCodingInfo(stream_index) are stored for the number represented by the field NumberOfStreamInPS. The field StreamPID[stream_index] represents the value of the PID corresponding to the elementary stream described in the PMT (Program Map Table) referred by the program sequence. The next block blkStream-CodingInfo(stream_index) describes information with respect to the encoding system of the elementary stream represented by the corresponding field StreamPID[stream_index].

For example, the block blkStreamCodingInfo(stream_index) describes information that denotes that the corresponding elementary stream is a video stream, an audio stream, an OB stream, or an MB stream. When the corresponding elementary stream is a video stream, information about video format, frame rate, and aspect ratio is also described.

FIG. 19 shows syntax that represents an example of the structure of a block blk(PIC). In an encoded stream such as an MPEG stream that has been inter-frame compressed, the decoding start position is limited to a part of the encoded stream such as the beginning of a GOP (Group Of Picture). A CPI (Characteristic Point Information) is a database of information of decoding start positions. The CPI correlates reproduction times and addresses of a file. In other words, the CPI has a table of information that represents start positions of decoding units.

When such a database is defined, if video data are reproduced from any time, the address of the file corresponding to the reproduction position can be obtained by referring to the CPI on the basis of the reproduction time. Since this address is the beginning of a decoding unit, the player can read the data from the address of the file and quickly display a picture.

The start position of a decoding unit contained in the CPI (in this example, the start position of a GOP) is referred to as an EP (Entry Point) entry.

In FIG. 19, a field Length has a data length of 32 bits and represents the data length immediately after this field Length until the end of the block blkCPI( ). According to the next if statement, unless the value of the field Length is "0", followed by an area reserved having a data length of 12 bits, a field CPIType is placed. The field CPIType has a data length of 4 bits and represents the type of the CPI. The next block blkEP-Map stores a table that associates PTS values with byte addresses of the corresponding clip AV stream file.

FIG. 20 shows syntax that represents an example of the structure of a block blkEPMap( ). Followed by an area reserved having a data length of 8 bits, a field NumberOfStreamPIDEntries is placed. The field NumberOfStreamPIDEntries has a data length of 8 bits and represents the number of entries of blocks blkEPMapForOneStreamPID's in the block blkEPMap( ). According to a for loop statement, with a loop variable of a value [k], information about entry points is described for the number represented by the field NumberOfStreamPIDEntries.

In the for loop statement, a field StreamPID[k] has a data length of 16 bits and represents the value of the PID of a transport packet that transports an elementary stream referred from a block blkEPMapForOneStreamPID as a [k]-th entry of the block blkEPMap( ) (hereinafter, described as the [k]-th block blkEPMapForOneStreamPID).

Followed by an area reserved having a data length of 10 bits, a field EPStreamType[k] is placed. The field EPStreamType[k] has a data length of 4 bits and represents the type of an elementary stream referred from the [k]-th block blkEP-MapForOneStreampID. A field NumberOfEPCoarseEntries [k] has a data length of 16 bits and represents the number of entries in a coarse unit search sub table (EP coarse table) in the [k]-th block blkEPMapForOneStreamPID. A field NumberOfEPFineEntries[k] has a data length of 18 bits and represents the number of entries in a fine unit search sub table (EP fine table) in the [k]-th block blkEPMapForOneStream-PID. A field EPMapForOneStreamPIDStartAddress[k] has a data length of 32 bits and represents the relative byte position of the beginning of the [k]-th block blkEPMapFor-OneStreamPID in the block blkEPMap( ). This value is represented by the number of bytes from the first byte of the block blkEPMap( ).

After the description of the foregoing for loop statement, followed by a padding word having a data length of an integer multiple of 16 bits, according to a for loop statement, with a loop variable of a value [k], blocks blkEPMapForOneStream-PID(EPStreamType[k], NumberOfEPCoarseEntries[k], and NumberOfEPFineEntries[k])'s are stored for the number represented by the field NumberOfStreamPIDEntries. In other words, the argument NumberOfEPCoarseEntries[k] represents the number of entries PTSEPCoarse's and entries SPNEPCoarse's stored in the sub table (EP coarse table). Likewise, the argument NumberOfEPFineEntries[k] represents the number of entries PTSEPFine's and entries SPNEPFie's stored in the sub table (EP fine table). Hereinafter, the argument NumberOfEPCoarseEntries[k] and the argument NumberOfEPFineEntries[k] are sometimes referred to as the number of entries Nc and the number of entries Nf, respectively.

FIG. 21 shows syntax that represents an example of the structure of a block blkEpMapForOneStreamp-ID(EP_stream_type, Nc, Nf). To describe semantics of the block blkEPMapForOneStreamPID(EP_stream_type, Nc, Nf), meaning of an entry PTSEPStart and an entry SPNEPStart that are entries as the sources of data stored in the block blkEPMapForOneStreamPID(EP_stream_type, Nc, Nf) will be described.

An entry PTSEPStart and an entry SPNEPStart associated with the entry PTSEPStart represent entry points of an AV stream. An entry PTSEPFine and an entry PTSEPCoarse associated with an entry PTSEPFine are obtained from the same entry PTSEPStart. In addition, an entry SPNEPFine and an entry SPNEPCoarseassociated with an entry SPNEPFine are obtained from the same entry SPNEPStart.

Figure 22:
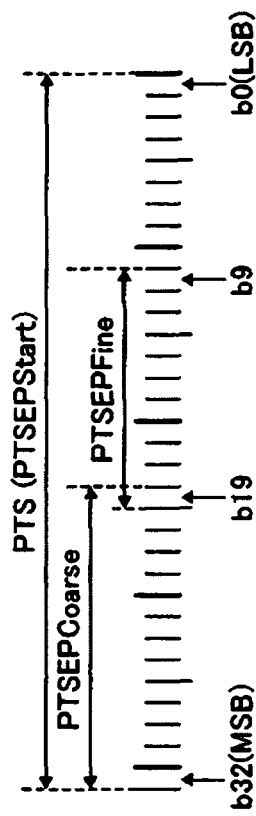
FIG. 22 is a schematic diagram showing an example of the format of an entry PTSEPCoarse and an entry PTSEPFine.

FIG. 22 shows an example of formats of the entry PTSEPCoarse and the entry PTSEPFine. The PTS, namely the entry PTSEPStart, has a data length of 33 bits. When the MSB and the LSB of the entry PTSEPStart are 32-th bit and 0-th bit, respectively, in the example shown in FIG. 22, 14 bits from the 32-th bit to the 19-th bit of the entry PTSEPStart are used for the entry PTSEPCoarse for a coarse unit search. The entry PTSEPCoarse allows for a search with a resolution in the range from 5.8 seconds to 26.5 hours. Eleven bits from the 19-th bit to the 9-th bit of the entry PTSEPStart are used for the entry PTSEPFine for a fine unit search. The entry PTSEPfine allows for a search with a resolution in the range from 5.7 milliseconds to 11.5 seconds. The 19-th bit of the entry PTSEPStart is commonly used for the entry PTSEPCoarse and the entry PTSEPFine. Nine bits from the 0-th bit to the 8-th bit on the LSB side of the entry PTSEPStart are not used.

FIG. 23 shows an example of the formats of the entry SPNEPCoarse and the entry SPNEPFine. The source packet number, namely the entry SPNEPStart has a data length of 32 bits. When the MSB and the LSB of the entry SPNEPStart are 31-st bit and 0-th bit, in the example shown in FIG. 23, all bits from the 31-st bit to the 0-th bit of the entry SPNEPStart are used for the entry SPNEPCoarse for a coarse unit search. Seventeen bits from the 16-th bit to the 0-th bit of the entry SPNEPStart are used for the entry SPNEPFine for a fine unit search. The entry SPNEPFine allows for a search for up to around 25 MB (Mega Byte) AV stream file.

For a source packet number, a predetermined number of bits on the MSB side of the entry SPNEPCoarse may be used. For example, seventeen bits from the 31-st bit to the 16-th bit of the entry SPNEPStart may be used for the entry SPNEPCoarse and seventeen bits from the 16-th bit to the 0-th bit of the entry SPNEPStart may be used for the entry SPNEPFine.

Based on the foregoing, the entry PTSEPStart and the entry SPNEPStart are defined as follows.

As shown in FIG. 22, the entry PTSEPStart is an unsigned integer that has a data length of 33 bits and represents a PTS having a data length of 33 bits of a video access unit that starts with a random accessible picture (for example, an IDR (Instantaneous Decoding Refresh) picture or an I (Intra) picture) of an AV stream.

As shown in FIG. 23, the entry SPNEPStart is an unsigned integer having a data length of 32 bits and represents the address of a source packet including the first byte of a video access unit associated with the entry PTSEPStart in an AV stream file. The entry SPNEPStart is represented as a source packet number. The entry SPNEPstart is counted as a value that starts with "0" and increments by 1 for each source packet from the first source packet of an AV stream file.

Referring to FIG. 21, the block blkEPMapForOneStream-PID(EP_stream_type, Nc, Nf) describes a first for loop statement and a second for loop statement. The first for loop statement describes a sub table (EP coarse table) for a coarse unit search. The second for loop statement describes a sub table (EP fine table) for a fine unit search performed on the basis of the search result of the sub table (EP coarse table).

The first for loop statement is immediately preceded by a field EPFineTableStartAddress. The field EPFineTableStartAddress has a data length of 32 bits and represents the start address of the first byte of a field ReservedEPFine[EP_fine_id] of the second for loop as the relative number of bytes from the first byte of the block blkEPMapForOneStreamPID (EP_stream_type, Nc, Nf). The relative number of bytes starts with value "0".

The first for loop statement is repeated with a loop variable [i] the number of times presented by the number of entries of the sub table (EP coarse table). Pairs of a field RefToEPFineID[i], an entry PTSEPCoarse[i], and an entry SPNEPCoarse[i] are stored for the number represented by the number of entries Nc. In the first for loop statement, the field RefToEPFine[i] has a data length of 18 bits and represents the entry number in the sub table (EP fine table) of the entry PTSEPFine associated with the entry PTSEPCoarse represented by the field PTSEPCoarse[i] preceded by the field RefToEPFineID[i]. The entry PTSEPFine and the entry PTSEPCoarse associated with this entry PTSEPFine are obtained from the same entry PTSEPStart. The field RefToEPFineID[i] is obtained by the value of the loop variable [EP_fine_id] defined in the order described in the second for loop statement.

After the first for loop statement, followed by a padding word, the second for loop statement is described. The second for loop statement is repeated with a loop variable [EP_fine_id] the number of times represented by the number of entries Nf of the sub table (EP fine table). Pairs of a field ReservedEPFine[EP_fine_id] having a data length of 1 bit, a field IEndPositionOffset[EP_fine_id] having a data length of 3 bits, a field PTSEPFine[EP_fine_id] having a data length of 11 bits, and a field SPNEPFine[EP_fine_id] having a data length of 17 bit are stored for the number represented by the number of entries Nf. Among of these fields, the field PTSEPFine[EP_fine_id] and the field SPNEPFine[EP_fine_id] stores the entry PTSEPFine and the entry SPNEPFine, respectively, referred from the sub table (EP fine table) on the basis of the loop variable [EP_fine_id].

The entry PTSEPCoarse and the entry PTSEPFine and the entry SPNEPCoarse and the entry SPNEPFine are obtained as follows. Assuming that sub table (EP fine table) contains Nf entries arranged in the ascending order of the values of associated data SPNEPStart. Each entry PTSEPFine is obtained from the corresponding entry PTSEPStart according to the following formula (1).

$$\text{PTSEPFine}[EP\_fine\_id] = (\text{PTSEPStart}[EP\_fine\_id] >> 9)/2^{11} \quad (1)$$

The relationship between the entry PTSEPCoarse and the corresponding entry PTSEPFine is expressed by the following formulas (2) and (3).

$$\text{PTSEPCoarse}[i] = (\text{PTSEPStart}[\text{RefToEPFineID}[i]] >> 19)/2^{14} \quad (2)$$

$$\text{PTSEPFine}[\text{ReFToEPFineID}[i]] = (\text{PTSEPStart}[\text{RefToEPFineID}[i]] >> 9)/2^{11} \quad (3)$$

Each entry SPNEPFine is obtained from the corresponding entry SPNEPStart according to the following formula (4).

$$SPNEPFine[EP\_fine\_id]=SPNEPStart[EP\_fine\_id]/2^{17} \quad (4)$$

The relationship between the entry SPNEPCoarse and the corresponding entry SPNEPFine is expressed by the following formulas (5) and (6).

$$SPNEPCoarse[i]=SPNEPStart[RefToEPFineID[i]] \quad (5)$$

$$SPNEPFine[RefToEPFineID[i]]=SPNEPStart[RefToEPFineID[i]]/2^{17} \quad (6)$$

In the foregoing formulas (1) to (6), symbol ">>x" denotes that bits having digits in excess of x bits on the LSB side are used.

Next, a block blkExtensionData( ) for storing extension data will be described. This block blkExtensionData( ) is defined such it can store predetermined extension data. The block blkExtensionData( ) can be described in each of the file "index.bdmv" that stores an index table, the file "xxxxx.mpls" that stores a play list, and a clip information file "zzzzz.clpi".

FIG. 24 shows syntax that represents an example of the structure of a block blkExtensionData( ). A field Length has a data length of 32 bits and represents the data length immediately after this field Length until the end of the block blkExtensionData( ) in bytes. Unless the data length represented by the field Length is "0", followed by an if statement, information is described.

A field DataBlockStartAddress has a data length of 32 bits and represents the start address of a block DataBlock( ) that stores the main body of extension data of this syntax as the relative number of bytes from the beginning of bytes of the block blkExtensionData( ). In other words, the relative number of bytes starts with "0". The field DataBlockStartAddress needs to satisfy a 32-bit alignment condition that follows.

DataBlockStartAddress % 4=0

Followed by an area reserved having a data length of 24 bits, a field NumberOfExtDataEntries is placed. The field NumberOfExtDataEntries has a data length of 8 bits and represents the number of entries of extension data stored in the block DataBlock( ) of the block blkExtensionData( ). Entries of extension data store information necessary to obtain the main body of extension data. In this example, entries of extension data are a block ext_data_entry( ) that is composed of a field ExtDataType, a field ExtDataVersion, a field ExtDataStartAddress, and a field ExtDataLength. In the block blkExtensionData( ), blocks ext_data_entry( )'s exist for the number represented by the field NumberOfExtDataEntries according to the first for loop statement.

The field ExtDataType has a data length of 16 bits and denotes that extension data contained in this block blkExtensionData( ) are extension data for a recording apparatus. The value of this field ExtDataType is a first value with which extension data are identified. The value of the field ExtDataType can be defined to be assigned by a licensor of a standard including this block blkExtensionData( ). The field ExtDataVersion is a second value with which extension data are identified. The field ExtDataVersion can be defined to represent the version number of this extension data. In this block blkExtensionData( ), two or more entries of block ext_data_entry( ) cannot exist when the values of the field ExtDataType and the field ExtDataVersion of these entries are the same.

The field ExtDataStartAddress has a data length of 32 bits and represents the start address of extension data corresponding to the entry (block ext_data_entry( )) of extension data that contain this field ExtDataStartAddress. The field ExtDataStartAddress represents the start address of extension data ext_data as the relative number of bytes from the beginning of bytes of the block blkExtensionData( ). The field ExtDataStartAddress needs to satisfy a 32-bit alignment condition that follows.

ExtDataStartAddress % 4=0

The field ExtDataLength has a data length of 32 bits and represents the data length of extension data corresponding to the entry (block ext_data_entry( )) of extension data that contain the field ExtDataStartAddress. The data length is represented in bytes.

When entries (blocks ext_data-entry( )'s) of extension data are described for the number represented by the field NumberOfExtDataEntries, a field padding_word having a data length of 16 bits and composed of any data sequence is repeated the number of times L1 as pairs of two fields. Thereafter, the block DataBlock( ) that stores the main body of extension data is described. The block DataBlock( ) stores at least one entry of extension data. Each entry of extension data ext_data is obtained from the block DataBlock( ) based on the foregoing field ExtDataStartAddress and field ExtDataLength.

Figure 25:
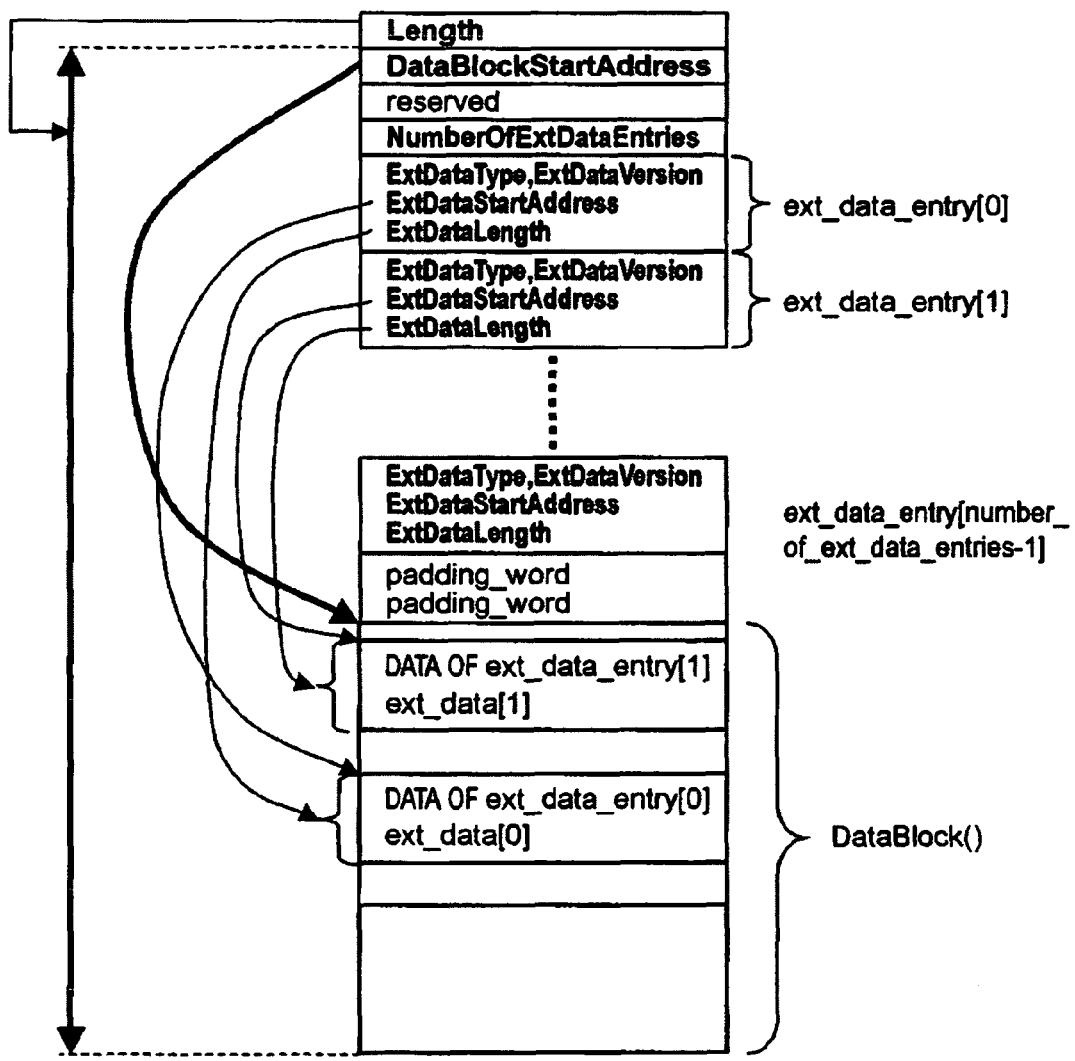
FIG. 25 is a schematic diagram showing the relationship of references of each entry of data of the block blkExtensionData( )

FIG. 25 shows the relationship of references of entries of data in the block blkExtensionData( ). A field length represents the data length immediately after the field Length until the end of the block blkExtensionData( ). A field DataBlockStartAddress represents the start position of a block DataBlock( ). Blocks ext_data_entry's are described for the number represented by a field NumberOfExtDataEntries. A field padding_word having any data length is placed between the last block ext_data_entry and the block DataBlock( ).

In the block DataBlock( ), extension data ext_data represented by a block ext_data_entry( ) is placed. The position and data length of each of extension data ext_data's are represented by a field ExtDataStartAddress and a field ExtDataLength of the corresponding block ext_data_entry( ). Thus, the order of extension data ext_data's in the block DataBlock( ) may not need to match the order of the corresponding block' ext_data_entry( )'s.

When extension data are structured in two layers of the block DataBlock( ) that stores the main body of the extension data and the block ext_data_entry( ) that stores access information for extension data contained in the block DataBlock( ), a plurality of entries of extension data can be stored.

Figure 26:
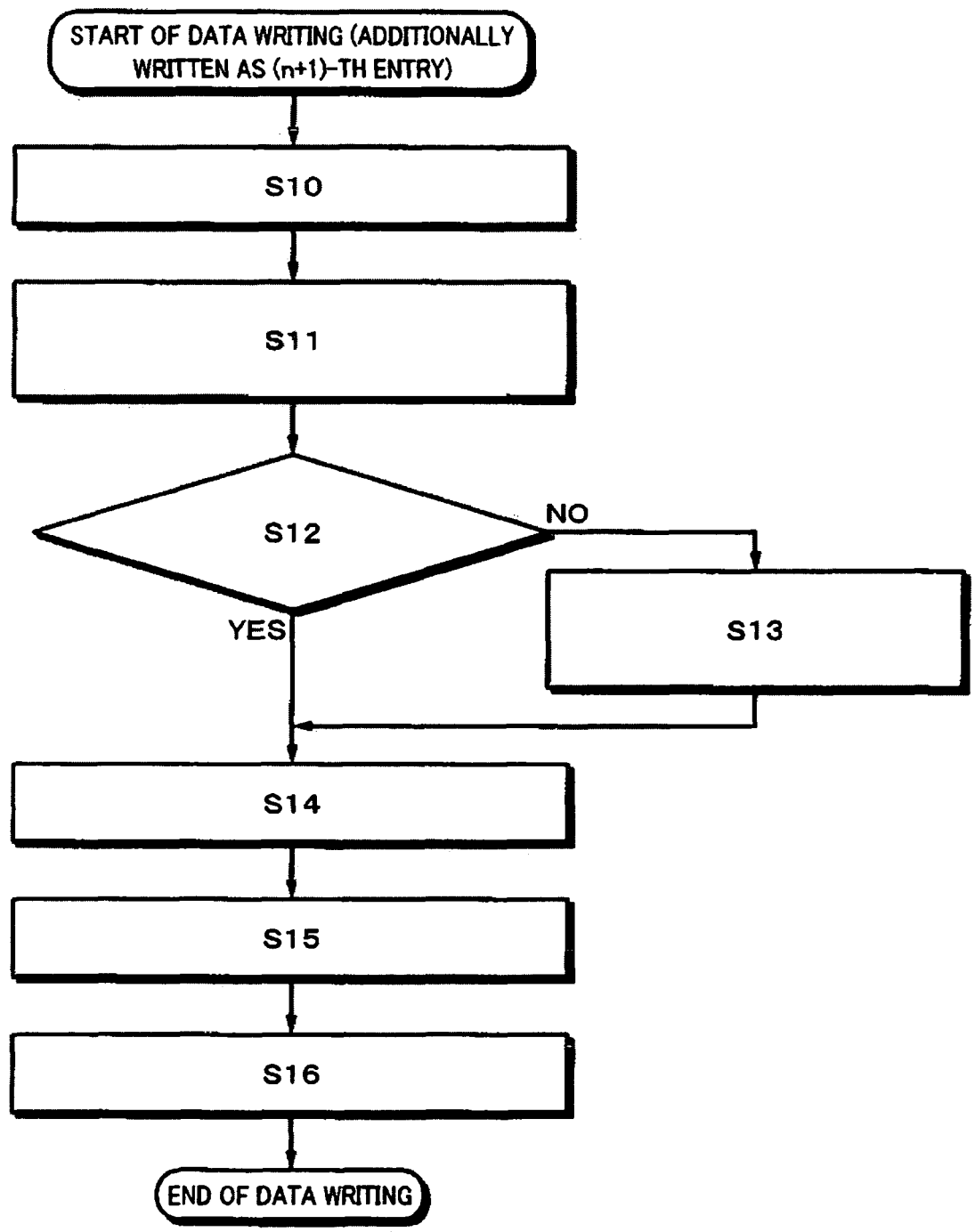
FIG. 26 is a flow chart showing an example of a process of writing data to the block blkExtensionData( )

Next, an example of a method of creating and reading the foregoing extension data will be described. FIG. 26 is a flow chart showing an example of a process of writing data in the block blkExtensionData( ). FIG. 26 shows an example of which extension data are added as an (n+1)-th entry to the block blkExtensionData( ) such that the block blkExtensionData( ) is rewritten.

First of all, at step S10, the data length of extension data to be written is obtained and set as the value of the field ExtDataLength[n+1]. The notation "[n+1]" represents an (n+1)-th entry number. At the next step S11, the values of the field ExtDataLength and the field ExtDataStartAddress of blocks ext_data_entry( )'s listed in the current block blkExtensionData( ) are checked and the use state of the block DataBlock( ) is obtained.

At the next step S12, it is determined whether or not the block DataBlock( ) has a continuous free area equal to or larger than the data length represented by the field ExtDataLength[n+1] that represents the data length of extension data to be written. When the determined result denotes that block DataBlock( ) has such an area, the flow of the process advances to step S14.

In contrast, when the determined result denotes that the block DataBlock( ) does not have a continuous free area that is in excess of the data length represented by the field ExtDataLength[n+1], the flow of the process advances to step S13. At step S13, the value of the field Length of the block blkExtensionData( ) is increased such that a continuous free area that is equal to or larger than the data length represented by the field ExtDataLength[n+1] is created in the block DataBlock( ). After such a free area has been created, the flow of the process advances to step S14.

At step S14, the start address of the area in which the extension data are written is decided such that the value of the start address is set to the field ExtDataStartAddress[n+1]. At the next step S15, the extension data ext_data[n+1] having the data length represented by the field ExtDataLength[n+1] that has been set at step S10 are written from the field ExtDataStartAddress[n+1].

After the data have been written, the flow of the process advances to step S16. At step S16, the field ExtDataLength [n+1] and the field ExtDataStartAddress[n+1] are added to the block ext_data_entry( ).

In the foregoing, it is assumed that the block blkExtensionData( ) to be rewritten has been read from a record medium such as a disc and stored in the memory of the recording apparatus. Thus, the increase of the block blkExtensionData( ) by changing the value of the field Length at step S13 is performed by the system. The system properly allocates the memory.

Figure 27:
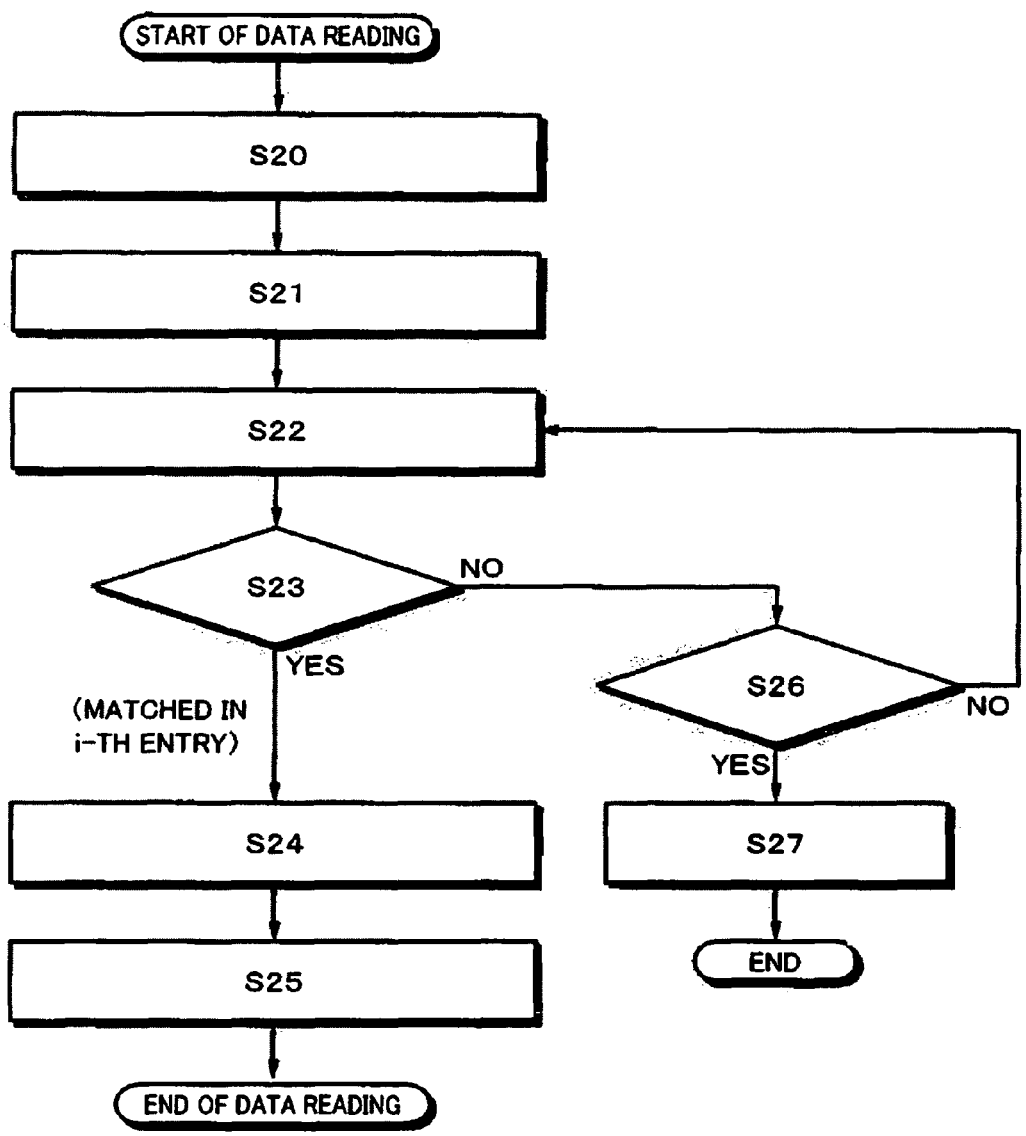
FIG. 27 is a flow chart showing an example of a process of reading extension data from the block blkExtensionData( )

FIG. 27 is a flow chart showing an example of a process of reading extension data from the block blkExtensionData( ). The process of the flow chart shown in FIG. 27 can be applied both to a reproduction-only record medium and a recordable record medium. First of all, at step S20, the value of the field ExtDataType is obtained from the standard on which extension data to be read are based. At step S21, the value of the field ExtDataVersion is obtained from the type of extension data to be read.

At the next step S22, each of blocks ext_data_entry( )'s listed in the block blkExtensionData( ) is read one by one. At step S23, it is determined whether or not the values of the field ExtDataType and the field ExtDataVersion of each of blocks ext_data_entry( )'s match the values of the field ExtDataType and the field ExtDataVersion obtained at the foregoing steps S20 and S21.

When the determined result denotes that they do not match, the flow of the process advances to step S26. At step S26, it is determined whether or not all blocks ext_data_entry( )'s listed in the block blkExtensionData( ) have been read. When the determined result denotes that all blocks ext_data_entry( )'s have been read, the flow of the process advances to step S27. At step S27, since extension data to be read do not exist in the block blkExtensionData( ), the process is completed. In contrast, when the determined result denotes that all blocks ext_data_entry( )'s have not been read, the flow of the process returns to step S22. At step S22, the next block ext_data_entry( ) is read.

When the determined result at step S23 denotes that the values of the field ExtDataType and the field ExtDataVersion of the block ext_data_entry( ) match the values of the field ExtDataType and the field ExtDataVersion obtained at the foregoing steps S20 and S21, the flow of the process advances to step S24. In this example, it is assumed that they match for the [i]-th entry of the block blkExtensionData( ).

At step S24, the value of the field ExtDataLength[i] and the value of the field ExtDataStartAddress[i] are read from the [i]-th entry of the block ext_data_entry( ). At step S25, data are read from the address represented by the field ExtDataStartAddress[i] that has been read at step S24 for the data length represented by the field ExtDataLength[i].

Next, the extension data block blkExtensionData( ) that stores extension data and that can be defined in the foregoing index file "index.bdmv", movie object file "MovieObject.bdmv", play list file "xxxxx.mpls", and clip information file "zzzzz.clpi" will be described.

First of all, an example of an extension data block defined in the index file "index.bdmv" will be described. In this example, an extension data block of which attribute information unique to a recordable record medium is added to each play list will be described. FIG. 28 shows syntax that represents an example of the structure of a block DataBlock( ) (refer to FIG. 24) of a block blkExtensionData( ) in the file "index.bdmv". In the example shown in FIG. 28, the block DataBlock( ) is described as the block blkIndexExtensionData( ).

First of all, with reference to FIG. 24, value "0×1000" and value "0×0100" are set to the field ExtDataType and the field ExtDataVersion of the block blkExtensionData( ), respectively. The values that have been described in these field ExtDataType and field ExtDataVersion are identified with reference to a table that has been stored, for example, in the ROM (Read Only Memory) on the reproducing apparatus side. The block blkIndexExtensionData( ) is stored in an area represented by the field ExtDataStartAddress and the field ExtDataLength in the block DataBlock( ).

In the block blkIndexExtensionData( ), a field TypeIndicator describes a four-letter character string encoded according to an encoding system prescribed in the ISO 646. The four-letter character string represents the type of data that follow. In the example shown in FIG. 28, the field TypeIndicator describes a four-letter character string "IDEX" that has been encoded according to the system prescribed in the ISO 646 and that denotes that the type of data that follow is extension data of an index file.

The field TypeIndicator is followed by an area reserved having a data length of 32 bits, followed by a field TableOfPlayListStartAddress having a data length of 32 bits. The field TableOfPlayListStartAddress represents the start address of the block blkTableOfPlayList( ) based on the beginning of this block blkIndexExtensionData( ).

The field TableOfPlayListStartAddress is followed by a field MakersPrivateDataStartAddress having a data length of 32 bits. The field MakersPrivateDataStartAddress represents the start address of a block blkMakersPrivateData( ) based on the beginning of the block blkIndexExtensionData( ). Followed by an area reserved having a data length of 192 bits, a block blkUIAppInfoAVCHD( ) is placed. A padding word padding_word having a data length of 16 bits is repeated the number of times represented by a value N1. Thereafter, the block blkTableOfPlayList( ) is placed. Thereafter, a padding word padding_word having a data length of 16 bits is repeated the number of times represented by a value N2. Thereafter, a block blkMakersPrivateData( ) is placed. The block blkMakersPrivateData( ) is followed by a padding word padding_word having a data length of 16 bits. The padding word padding_word is repeated the number of times represented by a value N3.

Since the block blkUIAppInfoAVCHD( ) and the block blkMakersPrivateData( ) less relate to the present invention, their description will be omitted.

FIG. 29 shows syntax that represents an example of the structure of the foregoing block blkTableOfPlayList( ). A field length has a data length of 32 bits and represents the data length immediately after this field Length until the end of the block blkTableOfPlayList( ) in bytes. The field Length is followed by a block blkFirstPlaybackTitlePlayLists( ) that describes information about a play list with which a playback title is reproduced and a block blkMenuTitlePlayLists( ) that describes information about a menu title. Since these block blkFirstPlaybackTitlePlayLists( ) and block blkMenuTitlePlayLists( ) less relate to the present invention, their description will be omitted.

Thereafter, a field NumberOfTitlePlayListPair having a data length of 16 bits is placed. The field NumberOfTitlePlayListPair describes the number of play lists with which a title other than a playback title and a menu title is reproduced. According to the next for loop statement, blocks blkmovieTitlePlayListPair( )'s are described for the number represented by the field NumberOfTitlePlayListPair. The block blkMovieTitlePlayListPair( ) contains a field PlayListFileName, a field PlayListAttribute, and a field RefToTitleID. In other words, the block blkMovieTitlePlayListPair( ) structurizes information of composed of the file name, attributes, and reference title ID for the [i]-th play list represented by this for loop statement.

Entries in the for loop statement are based on the order of which they are recorded. In other words, when one play list is added, the value of the field NumberOfTitlePlayListPair is incremented by "1" and information of the added play list is additionally written after information of existing play lists.

The field PlayListFileName has a data length of 40 bits (5 bytes) and describes the file name of the play list that has been encoded according to an encoding system prescribed in the ISO 646. The field PlayListFileName is followed by an area reserved having a data length of 6 bits, followed by the field PlayListAttribute. The field PlayListAttribute has a data length of 2 bits and represents an attribute assigned to the current play list. Play lists are categorized on the basis of their causes as a first type created together with a clip, a second type corresponding to a play list created with an existing title or all or a part of a play list, and a third type used to reproduce a menu. Each play list is assigned an attribute "Real" (first type), an attribute "Virtual" (second type), or an attribute "Menu" (third type) depending on the type of the play list.

Hereinafter, a play list assigned the attribute "Real" is referred to as a real play list. A play list assigned the attribute "Virtual" is referred to as a virtual play list. A play list assigned the attribute "Menu" is referred to as a menu play list.

The field RefToTitleId describes the ID (number) of the title to which the play list represented in the field PlayListFileName of the same loop belongs when the play list is created. As a more specific example, the field RefToTitleId describes the corresponding value title_id of the block blkIndexes( ) in the index file "index.bdmv". When this play list is reproduced only from a first play back title, the value of the field RefToTitleId is a first fixed value, for example, "0xFFFF". On the other hand, when this play list is reproduced only from a menu title, the value of the field RefToTitleId is a second fixed value, for example, "0xFFFE".

Next, a virtual player will be described in brief. When a disc having the foregoing data structure is loaded into a player, the player needs to convert commands contained in a movie object or the like that has been read from the disc into unique commands with which hardware of the player is controlled. The player has stored software with which such conversion is performed for these commands in a ROM (Read Only Memory) built in the player. Since this software causes the player to operate in accordance with prescriptions of the AVCHD format through the disc and the player, this software is referred to as the virtual player.

Figures 30A, 30B:
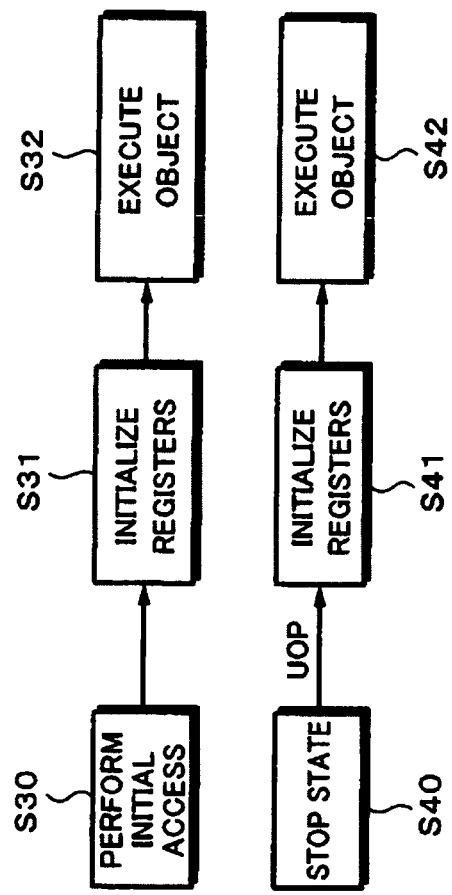
FIG. 30A and FIG. 30B are flow charts showing an outline of the operation of a virtual player.

FIG. 30A and FIG. 30B show an outline of the operation of the virtual player. FIG. 30A shows an example of which the virtual player loads a disc. When the disc is loaded into the player and the disc is initially accessed (at step S30), registers that store common parameters commonly used for one disc are initialized (at step S31). At the next step S32, a program described in a movie object or the like is read from the disc and executed. The initial access denotes that data are initially reproduced from the disc, for example, when the disc is loaded.

FIG. 30B shows an example of the operation of the player in the case that the user presses, for example, a play key in the stop state to command the player to reproduce data from the disc. In the initial stop state (at step S40), the user commands the player to reproduce data from the disc, for example, with a remote control commander or the like (UO: User Operation). When the player is commanded to reproduce data from the disc, the registers, namely common parameters, are initialized (at step S41). At the next step S42, a movie object execution phase starts.

Next, with reference to FIG. 31, the reproduction of a play list in the movie object execution phase will be described. It is assumed that by the UO or the like, the player has been commanded to start reproducing contents of title #1 from the disc. When the player has been commanded to start reproducing contents from the disc, the player refers to the index table (Index Table) shown in the foregoing FIG. 2 and obtains an object number corresponding to the reproduction of contents of title #1. Assuming that the number of an object that accomplishes the execution of contents of title #1 is #1, the player starts executing movie object #1.

Figure 31:
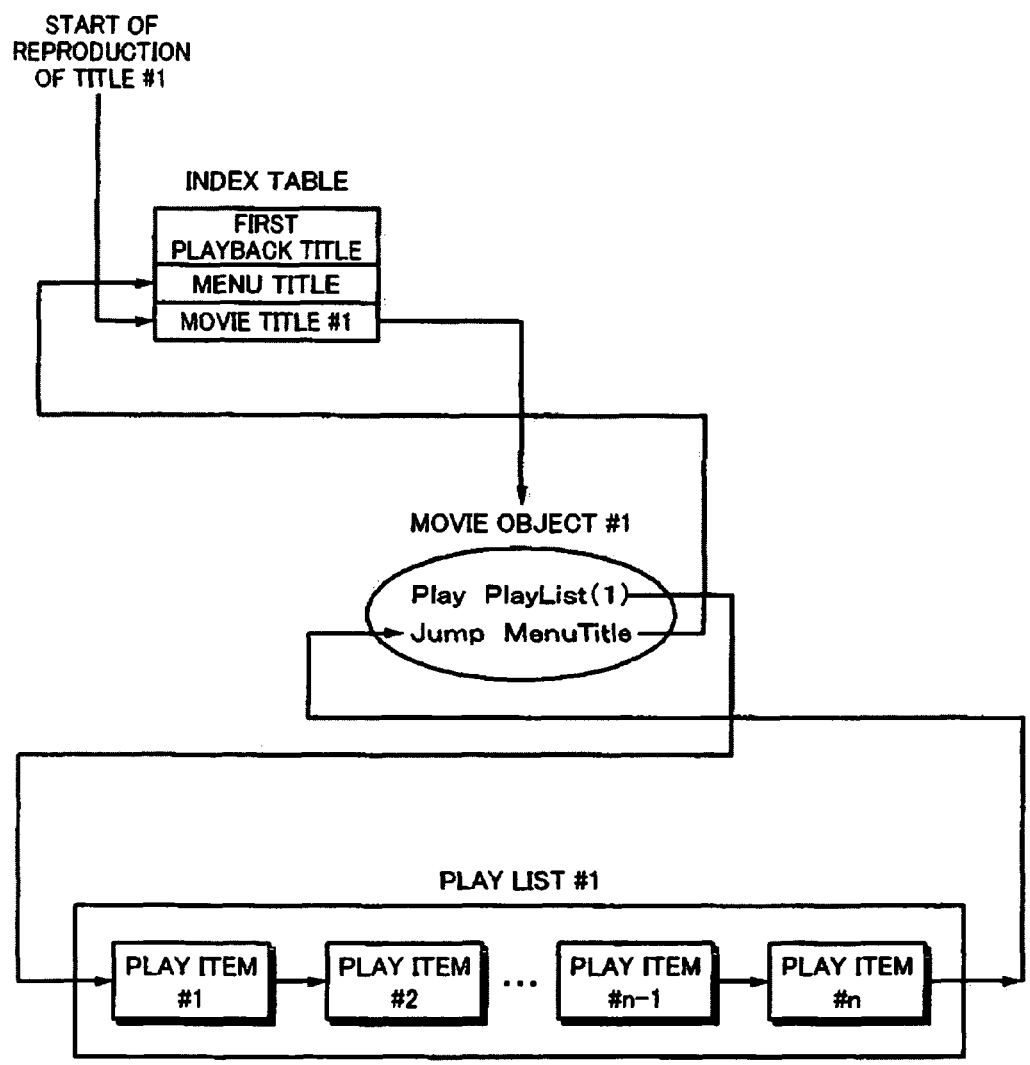
FIG. 31 is a schematic diagram showing an outline of the operation of the virtual player.

In the example shown in FIG. 31, assuming that a program described in movie object #1 is composed of two lines and a command of the first line is "Play PlayList(1)", the player starts reproducing play list #1. Play list #1 is composed of one or more play items. The player continuously reproduces the play items. After the player has completed the reproduction of all the play items of play list #1, the player restores the execution of movie object #1 and executes a command of the second line. In the example shown in FIG. 31, the command of the second line is "jump MenuTitle". The player executes this command and starts executing a movie object that accomplishes the menu title (MenuTitle) described in the index table.

Next, an embodiment of the present invention will be described. In this invention, management information for video data and audio data that have been recorded is temporarily stored in the RAM (Random Access Memory) that is a volatile memory and that is a work memory of the CPU and also written to a nonvolatile memory such as a flash memory. The management information is information, for example, stored in a clip information file corresponding to a clip AV stream file of video data and audio data. The management information written to the nonvolatile memory is written to a record medium on which video data and audio data are recorded at predetermined timings for example when the record medium is ejected or the power OFF operation is performed for the recording apparatus.

Since management information for video data and audio data that have been recorded is written to and stored in the nonvolatile memory, even if the power of the recording apparatus is unexpectedly turned off, when the power ON operation is performed, without necessity of replacing the record medium, reproduction of video data and audio data recorded on the record medium can be controlled with-the management information written to the nonvolatile memory. Of course, at this point, the management information written to the nonvolatile memory can be recorded to the record medium.

In addition, after the management information has been written to the nonvolatile memory, unless the record medium has not been replaced, reproduction control and edit operation for video data and audio data recorded on the record medium can be performed on the basis of the management information written to the nonvolatile memory. Since the management information is not read frequently from the record medium, the process can be performed at high speed.

The management information written to the nonvolatile memory is not limited to information stored in a clip information file. For example, a play list file that contains a play item that refers to the clip information file may be written as the management information to the nonvolatile memory together with the clip information file.

Figure 32:
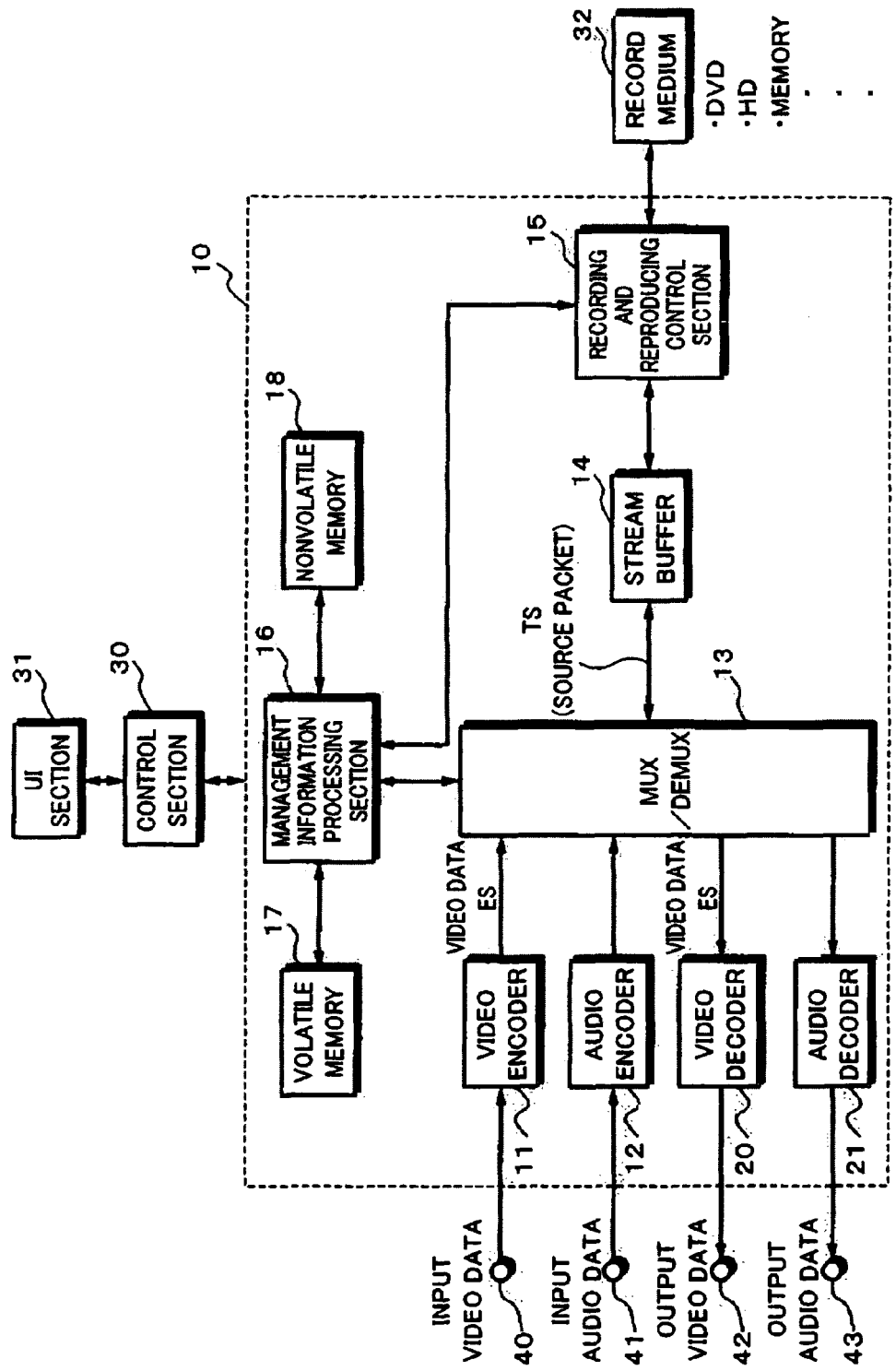
FIG. 32 is a block diagram showing an outline of an example of the structure of a recording and reproducing apparatus according to an embodiment of the present invention.

FIG. 32 shows an outline of an example of the structure of a recording and reproducing apparatus according to an embodiment of the present invention. The recording and reproducing apparatus exemplified in FIG. 32 can be used as a single recording and reproducing apparatus that records video data and audio data that that have been input from the outside to the record medium and that reproduces video data and audio data that have been recorded on the record medium. Instead, the recording and reproducing apparatus can be used as a recording block that is used in a video camera apparatus together with a camera block that has an optical system, an image capturing device, and so forth and that records video data based on a captured image signal to the record medium.

As applicable compression-encoding system and multiplexing system, various systems can be contemplated. For example, the system prescribed in H.264|AVC can be applied for the compression-encoding system according to an embodiment of the present invention. In addition, as the multiplexing system, for example the MPEG2 systems are applied.

A control section 30 is a program that operates on, for example, a CPU (Central Processing Unit) and controls each section of the recording and reproducing section 10 on the basis of a program and data pre-stored in a ROM (Read Only Memory) connected to the CPU with a RAM (Random Access Memory) as a work memory connected to the CPU. Passages that connect the control section 30 and each section of the recording and reproducing section 10 are omitted in FIG. 32 for simplicity.

The program that operates on the control section 30 provides a file system that is used in this recording apparatus. For example, the control section 30 associates physical addresses of data recorded on a record medium 32 with files that store the data based on this file system and creates logical management information of the files that store each type of data. The foregoing directory structure shown in FIG. 6 is an example of logical management information of files. A new file is created and a file is opened and closed by the control section 30 based on the file system.

A UI (User Interface) section 31 has predetermined operation switches with which the user operates the recording apparatus and outputs control signals according to the operations of the operation switches. The control signals are supplied to the control section 30. The control section 30 controls the operation of each section of the recording and reproducing section 10 with processes of the program performed on the basis of the control signals supplied from the UI section 31 according to the user's operations. In addition, the UI section 31 has a simple display section and displays predetermined data, for example, title information recorded on the record medium 32.

Corresponding to operations for the UI section 31, record start operation and record stop operation for data recorded to the record medium 32 and reproduction operation for data from the record medium 32 by the recording and reproducing apparatus are controlled by the control section 30. A power switch that causes the power of this recoding and reproducing apparatus to be turned on/off is disposed, for example, in the UI section 31.

For example, according to the power OFF operation for the power switch, stop preparation for each section of the recording and reproducing apparatus is performed. In addition, a power supply section (not shown) is controlled to stop supplying power to each section of the recording and reproducing apparatus, resulting in stopping the operation of the recording and reproducing apparatus. In addition, for example, when the power ON operation is performed, the power supply section is controlled to start supplying power to each section of the recording and reproducing apparatus. In addition, in each section to which power is supplied, operation start preparation such as an initializing process is performed.

The power-off of the recording and reproducing apparatus by the power OFF operation for the power switch is a power-off according to a normal procedure. As another power-off according to a normal procedure, it can be contemplated that, for example, when the recording and reproducing apparatus is driven by a battery as the power supply, if the capacity of the battery decreases to a predetermined level, a process of automatically turning off the power. In other words, the power-off according to a predetermined procedure of the system of the recording and reproducing apparatus is a power-off according to a normal procedure. A forced power-off that is not associated with the system of the recording and reproducing apparatus, such as pull-out of the power cord or drop-out of the battery pack, is referred to as the unexpected power-off.

A video encoder 11 has a buffer memory that can store a plurality of frames of video data. The video encoder 11 stores the supplied base band digital video data in the buffer memory and compression-encodes the video data according to a predetermined system. In this example of which compression-encoding is performed according to a system prescribed in H.264|AVC, intraframe compression is performed by DCT (Discrete Cosine Transform) and intra-screen prediction and inter-frame compression is performed by a moving vector. In addition, entropy encoding is performed to improve the compression efficiency. Digital video data that have been compression-encoded by the video encoder 11 are output as an H.264|AVC elementary stream.

A video decoder 20 has a buffer memory that can store a plurality of frames of video data. The video decoder 20 stores the supplied compressed video data in the buffer memory, decodes the video data according to a decoding system corresponding to the compression-encoding system, and outputs the decoded data as baseband digital video data. In this example of which the video encoder 11 performs compression-encoding based on a system prescribed in H.264|AVC, the video decoder 20 also performs a decoding process based on a system prescribed in H.264|AVC corresponding to the video encoder 11. The video decoder 20 can decode and output the data based on times represented by a DTS (Decoding Time Stamp) and a PTS (Presentation Time Stamp) extracted by a multiplexer/demultiplexer 13 that will be described later (hereinafter, referred to as the MUX/DEMUX 13). Baseband digital video data decoded and obtained by the video decoder 20 are output from a terminal 42.

An audio encoder 12 compression-encodes the baseband digital audio data supplied from a terminal 41 according to a predetermined compression-encoding system, for example, the AC3 (Audio Code number 3) system. The compression-encoding system for audio data is not limited to the AC3 system. Audio data may be contemplated to be baseband data, not compression-encoded.

An audio decoder 21 decodes the supplied compressed audio data according to a decoding system corresponding to the compression-encoding system and outputs the decoded data as baseband digital audio data. In this example of which the audio encoder 12 performs compression-encoding according to the Dolby digital system, the audio decoder 21 also decodes the audio data according to a decoding system based on the Dolby digital system. The decoded audio data are output from a terminal 43 in synchronization with the video data that are output from the video decoder 20.

The MUX/DEMUX 13 has a multiplexer function of multiplexing supplied compression-encoded digital video data and digital audio data according to a predetermined system and outputting the multiplexed data as one data stream and a demultiplexing function of demultiplexing a data stream of which digital video data and digital audio data have been multiplexed in a predetermined manner into the digital video data and digital audio data and extracting the demultiplexed digital video data and digital audio data.

In this example of which multiplexing is performed on the basis of the MPEG2 systems, the multiplexer function is performed by multiplexing supplied compressed video data and compressed audio data with an MPEG2 transport stream on time-division basis. For example, the MUX/DEMUX 13 has a buffer memory and temporally stores the supplied compressed video data and compressed audio data in the buffer memory. The compressed video data stored in the buffer memory are divided in a predetermined size, a header is added to each divided portion, and thereby PES—(Packetized Elementary Stream) packets are created. Likewise, the compressed audio data are also divided into a predetermined size, a header is added to each divided portion, and thereby PES-packets are created. The header stores predetermined information prescribed in the MPEG2 systems, such as the PTS that represents the reproduction time of data stored in the packet and the DTS that represents the decode time thereof. The PES packets are further divided and placed in the payload of transport packets (TS packets). The header of each TS packet stores the PID (Packet Identification) that identifies the type and so forth of data placed in the payload. A header having a predetermined data length is added to each TS packet and thereby a source packet is created.

The demultiplexer function is the reverse process of the multiplexer function performed by extracting compressed video data and compressed audio data from a packet. For example, the header is separated from each of the supplied source packets and thereby TS packets are obtained. The PID is detected from the header of each of the TS packets. The TS packets is sorted according to the types of data stored in the payload. For each TS packet that has been sorted, data stored in the payload is extracted and reconstructed as PES packets. The compressed video data and compressed audio data are extracted from the payload of the PES packets. Header information is added to the compressed video data and compressed audio data according to information stored in the PES header and so forth and thereby one elementary stream of each of the compressed video data and compressed audio data is output.

A stream buffer 14 temporally stores source packets supplied from the MUX/DEMUX 13 (upon recording) or the recording and reproducing control section 15 (upon reproducing). When read and write timings for source packets against the stream buffer 14 are controlled in a predetermined manner, the access speed for the record medium 32 and the signal process speed for encoding and decoding of video data and audio data can be coordinated.

The recording and reproducing control section 15 controls recording for data to the record medium 32 and reproducing for data from the record medium 32. In other words, the recording and reproducing control section 15 writes data to a designated address and reads data from a designated address according to a command issued from an upper hierarchical section such as the control section 30.

As the record medium 32, for example, a recordable type DVD (Digital Versatile Disc) can be used. Instead, a hard disk drive may be used as the record medium 32. Instead of this, as the record medium 32, a hard disk drive may be used or a semiconductor memory may be applied to the record medium 32. In addition, as the record medium 32, it may be contemplated that a Blu-ray Disc (registered trademark) that has a more capacity than those is applied.

When the record medium 32 is a record medium that can be loaded to and unloaded from the recording and reproducing apparatus, the eject operation for the record medium 32 is performed at least on the basis of 20- the control of the control section 30. For example, according to the operation of the UI section 31 and the operation of an eject button disposed at another portion of the housing of the recording and reproducing apparatus, the eject mechanism (not shown) of the record medium 32 is controlled by the control section 30 and thereby the record medium 32 is ejected. In addition, the insertion operation of the recording and reproducing apparatus for the record medium 32 may be performed under the control of the control section 30.

A management information processing section 16 performs processes with respect to the foregoing index file ("index.bdmv"), movie object file ("movieObject.bdmv"), play list file ("xxxxx.mpls"), and clip information file ("zzzzz.mpls").

The function of the management information processing section 16 is accomplished, for example, both by the foregoing control section 30 and the program that operates on the CPU. Of course, the management information processing section 16 may be structured by hardware that is different from the control section 30. When the management information processing section 16 is accomplished by a program that operates on the control section 30, the RAM of the control section 30 corresponds to a volatile memory 17 and a nonvolatile memory 18 is connected to the control section 30.

The nonvolatile memory 18 is a memory that stores information without necessity of power supplied from the system of the recording and reproducing apparatus and, for example, a flash memory can be used. Instead of this, the nonvolatile memory 18 may be structured in such a manner that power is always supplied from the built-in battery or the like to a volatile memory such as a DRAM and even if the power of the recording and reproducing apparatus is turned off, the stored contents are kept.

Next, the operation upon recording of the recording and reproducing apparatus having such a structure according to an embodiment of the present invention will be described. Baseband digital video data are input from a terminal 40 to the recording and reproducing section 10 and then supplied to the video encoder 11. For example, when the record start operation is performed for the UI section 31, the video encoder 11 starts compression-encoding the supplied digital video data. The video encoder 11 compression-encodes baseband digital video data and outputs the resultant data as an H.264|AVC elementary stream (ES). The elementary stream is supplied to the MUX/DEMUX 13.

Baseband digital audio data are input from the terminal 41 to the recording and reproducing section 10 and then supplied to the audio encoder 12. The audio encoder 12 starts compression-encoding the audio data supplied at a timing when the record start operation is performed for the UI section 31. The digital audio data that have been compression-encoded by the audio encoder 12 are supplied to the MUX/DEMUX 13.

The MUX/DEMUX 13 multiplexes the supplied digital video data and digital audio data that have been compression-encoded in a predetermined system and outputs the resultant data as one data stream. For example, the MUX/DEMUX 13 has a buffer memory and temporarily stores the supplied compressed video data and compressed audio data in the buffer memory.

The compressed video data stored in the buffer memory are divided by a predetermined structure, a header is added to each divided portion, and thereby PES packets are created. Likewise, the compressed audio data are divided in a predetermined size, a header is added to each divided portion, and thereby PES packets are created. The header stores predetermined information prescribed in the MPEG2 systems, such as the PTS and the DTS. The PTS packets are further divided and placed in the payload of transport packets (TS packets). The PID that identifies data placed in the payload is stored in the header. A header having a predetermined length and that stores such as a source packet number that identifies a source packet is further added to each TS packet and thereby source packets are created. The source packets that are output from the MUX/DEMUX 13 are temporarily stored in the stream buffer 14.

The recording control section 15 monitors the amount of data stored in the stream buffer 14. When the amount of data stored in the stream buffer 14 becomes a predetermined amount or more, data are read from the stream buffer 14 every recording unit of the record medium 32 and written to the record medium 32.

The management information processing section 16 creates information to be stored in the foregoing index file, movie object file, play list file, and clip information file on the basis of record data with the volatile memory 17 as a work memory.

In this embodiment of the present invention, information at least stored in the clip information file of that created by the management information processing section 16 is stored to the volatile memory 17 and a part or all of which is written to the nonvolatile memory 18.

For example, while using the volatile memory 17 as a work memory, the management information processing section 16 creates clip information corresponding to a clip AV stream file that is being recorded on the basis of information supplied from the control section 30, the MUX/DEMUX 13, and the recording and reproducing control section 15 under the control of the control section 30. The clip information is, in other words, information necessary to crate a clip information file. The created information is stored in the volatile memory 17 and a part or all of which is written to the nonvolatile memory 18 in a predetermined manner.

The nonvolatile memory 18 tends to be written with data in a relatively large recording unit, for example, 512 bytes. Thus, it can be contemplated that, for example, in the volatile memory 17, addresses are managed in the unit of a block corresponding to the recording unit of the nonvolatile memory 18, data are read from the volatile memory 17 in the unit of this block, and the data are written to the nonvolatile memory 18.

An EP entry of the block blkCPI( ) of information stored in the clip information file is dynamic information against recording and is created as recording progresses. The management information processing section 16 obtains the PTS of the video access unit and the source packet number of the source packet that contains the first byte of the video access unit from the MUX/DEMUX 13 and creates an entry PTSEPStart and an entry SPNEPStart with the volatile memory 17 as a work memory. The created entry PTSEPStart and entry SPNEPStart are stored in the volatile memory 17 and written to the nonvolatile memory 18.

In other words, information written to the nonvolatile memory 18 is updated whenever the entry PTSEPStart and entry SPNEPStart are created. Instead, information written to the nonvolatile memory 18 may be updated whenever a predetermined number of entries PTSEPStart's and entries SPNEPStart's are created.

On the other hand, information that is fixed against recording in that stored in the clip information file can be written to the nonvolatile memory 18 when recording of the clip AV stream file is completed. For example, after the record stop operation is performed for the UI section 31, the operations of the video encoder 11 and the audio encoder 12 are stopped according to the record stop operation, all source packets stored in the stream buffer 14 are recorded to the record medium 32, fixed information to be written to this clip information file is written to the nonvolatile memory 18.

Examples of dynamic information against recording of that stored in the clip information file such as the foregoing EP entry are the field NumberOfSourcePackets in the block blkClipInfo( ) (refer to FIG. 16), the field NumberOfSTCSequence in the block blkSequenceInfo( ), the field PCRPID, the field SPNSTCStart, the field PresentationStartTime, and the field PresentationEndTime described in the for loop statement (refer to FIG. 17), the field NumberOfStreamInPS in the block blkProgramInfo( ), the field StreamPID described in the for loop statement (refer to FIG. 18), and so forth. Among these dynamic information, information obtained by counting a predetermined value as one clip AV stream file is created, for example, the field NumberOfSourcePackets, the field NumberOfSTCSequence, and the field NumberOfStreamInPS, can be treated as a fixed value when recording of the clip AV stream file is stopped.

When a play mark is placed at the record start position as the recording and reproducing apparatus starts recording, the management information processing section 16 creates a play list mark that has the reproduction time corresponding to the top frame created according to the record start operation for the UI section 31 as the value of the field MarkTimeStamp. The created play list mark is added to and stored as information stored in the play list file in the volatile memory 17.

Clip information stored in the nonvolatile memory 18 is written to the record medium 32 at a predetermined timing. For example, when the record medium 32 is a loadable/unloadable record medium to/from the recording and reproducing apparatus, upon ejection of the record medium 32 from the recording and reproducing apparatus, the contents stored in the nonvolatile memory 18 can be written to the record medium 32.

For example, according to the operation of the eject button (not shown), the management information processing section 16 is controlled by the control section 30 to read clip information from the nonvolatile memory 18. The management information processing section 16 creates a clip information file based on clip information that has been read from the nonvolatile memory 18 and supplies the clip information file to the recording and reproducing control section 15 directly or through the MUX/DEMUX 13 and the stream buffer 14. The recording and reproducing control section 15 writes the supplied clip information file to the record medium 32. After the clip information file based on the clip information that has been read from the nonvolatile memory 18 has been written to the record medium 32, the eject mechanism of the record medium 32 is controlled by the control section 30 to eject the record medium 32 from the recording and reproducing apparatus.

After the clip information stored in the nonvolatile memory 18 has been written as the clip information file to the record medium 32 as the eject operation for the record medium 32 has been performed, the clip information is deleted from the nonvolatile memory 18.

When the record medium 32 has not been ejected, information stored in the nonvolatile memory 18 may be written to the record medium 32 when the power OFF operation is performed. For example, when the power OFF operation is performed for the power switch (not shown), in the same manner as the foregoing, the management information processing section 16 is controlled by the control section 30 to read the clip information stored in the nonvolatile memory 18 from the nonvolatile memory 18, treat the clip information as a clip information file, supply the clip information file to the recording and reproducing control section 15 in a predetermined manner, and write the clip information file to the record medium 32. After the clip information file based on the clip information that has been read from the nonvolatile memory 18 has been written to the record medium 32, the power supply section (not shown) and each section of the recording and reproducing apparatus are controlled by the control section 30 to stop the operation of the recording and reproducing apparatus.

When clip information stored in the nonvolatile memory 18 has been written as a clip information file to the record medium 32 according to the power OFF operation, the clip information is not deleted from the nonvolatile memory 18.

Next, the operation upon reproducing of the recording and reproducing apparatus will be described. When the record medium 32 is loaded to the recording and reproducing apparatus, an index file and a movie object file are read from the record medium 32 and they are passed to the management information processing section 16. The management information processing section 16 stores information stored in these files in the volatile memory 17.

The control section 30 obtains information stored in the volatile memory 17 from the management information processing section 16 and causes the display section of the UI section 31 to display information with respect to a clip recorded on the record medium 32 based on the obtained information. When the user performs a predetermined operation for the UI section 31 based on the information that is displayed, he or she can command the recording and reproducing apparatus to reproduce the clip recorded on the record medium 32.

The control section 30 controls the management information processing section 16 and the recording and reproducing control section 15 according to the operation for the UI section 31 to refer to the index file stored in the volatile memory 17, call a command described in the movie object file, and read the play list file described in the command from the record medium 32. Thereafter, the management information processing section 16 and the recording and reproducing control section 15 are controlled to read a clip information file referred by a play item stored in the play list file from the record medium 32 based on the play list file that has been read. Information stored in the play list file and the clip information file that have been read from the record medium 32 are stored in the volatile memory 17.

Clip information stored in the clip information file that has been read from the record medium 32 is also written to the nonvolatile memory 18.

It is likely that a clip information file to be referred from the play list file does not exist on the record medium 32. For example, it may be contemplated that power to each section of the recording and reproducing apparatus is unexpectedly stopped during recording due to some cause not through a procedure of a normal power OFF operation. In this case, a clip information file stored in the nonvolatile memory 18 is not written to the record medium 32. Thus, the clip information file to be referred from the play item in the play list file has not been recorded in the record medium 32.

If a clip information file to be read does not exist in the record medium 32, the control section 30 refers to the contents stored in the nonvolatile memory 18. When the nonvolatile memory 18 has stored the corresponding clip information, the control section 30 reads the corresponding clip information and writes it to the volatile memory 17. The control section 30 controls reproducing of the corresponding clip AV stream file based on the clip information written to the volatile memory 17.

When a clip information file referred from the play list file does not exist in the record medium 32 and thereby clip information stored in the nonvolatile memory 18 is used, it is preferred to provide means of collating clip information stored in the nonvolatile memory 18 with the record medium 32. For example, unique identification information is recorded to the record medium 32 and clip information created while a clip AV stream is being recorded to the record medium 32 is associated with the clip information. When clip information stored in the nonvolatile memory 18 is used, identification information associated with the clip information is collated with identification information unique to the record medium 32.

The control section 30 issues a command to the recording and reproducing control section 15 to read the corresponding clip AV stream file based on the clip information file stored in the volatile memory 17. The recording and reproducing control section 15 reads the clip information file and the clip AV stream file from the record medium 32 according to this command. The clip AV stream file is read from the record medium 32 in the unit of a source packet and stored in the stream buffer 14 through the recording and reproducing control section 15.

The MUX/DEMUX 13 monitors the amount of data stored in the stream buffer 14. When source packets that are equal to or larger than a predetermined amount have been stored in the stream buffer 14, the MUX/DEMUX 13 reads data that the video decoder 20 is necessary to decode in the unit of a source packet. The source packets that have been read are supplied to the MUX/DEMUX 13 and temporarily stored in the buffer memory. The header is separated from each of the source packets and thereby TS packets are obtained. PES packets are reconstructed with data sorted for each data type based on the PID of the TS packets and stored in the payload. Data are extracted from the payload of the PES packets, predetermined header information and so forth such as the DTS and the PTS that designate decode and reproduction times are added based on information of the PES header, and thereby elementary streams of compression-encoded video data and audio data are created.

The compressed video data are supplied to the video decoder 20. The video decoder 20 stores the supplied compressed video data to the buffer memory. When data for a predetermined number of pictures have been stored, the video decoder 20 starts a decoding process for the data stored in the buffer memory. The decoded video data are successively output at frame timings according to the PTS based on the STC (System Time Clock) supplied from, for example, a system clock (not shown).

On the other hand, compressed audio data are supplied to the audio decoder 21. The audio decoder 21 performs a predetermined decoding process for the compressed audio data. The decoded audio data are output from the audio decoder 21 in synchronization with video data that are output from the video decoder 20.

Next, with reference to a flow chart shown in FIG. 33 and the foregoing block diagram shown in FIG. 32, an example of a recording method for a clip information file according to an embodiment of the present invention will be described. In this example, it is assumed that the record medium 32 is a recordable type DVD and the record medium 32 is called the disc.

At step S30, the disc is loaded into the recording and reproducing apparatus. For example, when the record start operation is performed for the UI section 31 (at step S31), the control section 30 controls each section of the recording and reproducing apparatus to start recording video data that are input from the terminal 40 and audio data that are input from the terminal 41 to the disc.

In other words, video data and audio data are encoded by the video encoder 11 and the audio encoder 12, respectively, video stream data and audio stream data are obtained, and they are supplied to the MUX/DEMUX 13. The MUX/DEMUX 13 PES-packetizes these supplied stream data, divides PES packets in a predetermined size, adds the PID to each divided portion, obtains TS packets, adds a header having a predetermined size to each TS packet, and obtain source packets. The source packets are temporarily stored in the stream buffer 14, supplied to the recording and reproducing control section 15, and then recorded as a clip AV stream file to the disc.

While the clip AV stream file is being recorded to the disc, the management information processing section 16 obtains time information and packet information from the MUX/DEMUX 13 and creates an EP entry based on the obtained information with the volatile memory 17 used as a work memory (at step S32). The created EP entry is stored in the volatile memory 17. In addition, the created EP entry is written to a predetermined area of the nonvolatile memory 18 (at step S33). At this point, it is preferred that information that associates the EP entry of the nonvolatile memory 18, the corresponding clip AV stream file, and the disc on which the clip AV stream file is being recorded be created and written to the nonvolatile memory 18 or the like. The clip AV stream file is continuously recorded until the record stop operation is performed and the cycle of creation of an EP entry and writing of the created EP entry to the nonvolatile memory 18 is repeated (at step S34).

In the foregoing example, it was described that whenever an EP entry is created, it is written to the nonvolatile memory 18. However, writing of an EP entry to the nonvolatile memory 18 is not limited to such an example. For example, an EP entry may be written to the nonvolatile memory 18 whenever the number of EP entries stored in the volatile memory 17 becomes a predetermined number or whenever recording is performed for a predetermined time period. For example, it can be contemplated that an EP entry stored in the volatile memory 17 is written to the nonvolatile memory 18 at intervals of a predetermined time period such as 10 seconds or 1 minute.

When the record stop operation is performed for the UI section 31 (at step S34), the flow of the process advances to step S35. At step S35, fixed information that is stored in the clip information file is created. In addition, information that occurs when recording is stopped, such as information of which a predetermined value of one clip AV stream file is counted, is created at step S35. At step S35, these information is created with the volatile memory 17 as a work memory. The created information is stored in the volatile memory 17. The information created at step S5 is written to a predetermined area of the nonvolatile memory 18 at the next step S36. At this point, it is preferred that information that associates this information in the nonvolatile memory 18, the corresponding clip AV stream file, and the disc on which the clip AV stream file is being recorded be created and written to the nonvolatile memory 18 or the like.

When the disc eject operation is performed after the record stop operation (at step S37), the flow of the process advances to step S38. At step S38, information written to the nonvolatile memory 18 is written as a clip information file to the disc. For example, the management information processing section 16 reads information written to the nonvolatile memory 18, creates a clip information file, supplies the clip information file to the recording and reproducing control section 15, and causes it to write the clip information file to the disc under the control of the control section 30 according to the eject operation for the eject button (not shown).

After the information written to the nonvolatile memory 18 has been written to the disc, the flow of the process advances to step S39. At step S39, the contents stored in the nonvolatile memory 18 are cleared. Thereafter, the control section 30 controls the eject mechanism for the disc to eject the disc from the recording and reproducing apparatus (at step S40). When the power OFF operation is performed (at step S41), the flow of the process advances to step S42. At step S42, a predetermined operation stop process is performed, for example, power from the power supply section (not shown) to each section of the recording and reproducing apparatus is stopped. When the power OFF operation is not performed, the flow of the process can be returned to step S30. At step S30, another disc can be loaded and recording can be started.

On the other hand, the power OFF operation can be performed without the disc eject operation. In other words, after the record stop operation has been performed, when the eject operation has not been performed (at step S37) and the power OFF operation has been performed (at step S43), the flow of the process advances to step S44. At step S44, information written in the nonvolatile memory 18 is written as a clip information file to the disc. Thereafter, the flow of the process advances to step S42. At step S42, a predetermined operation stop process is performed.

When the power OFF operation is not performed at step S43, the flow of the process returns to step S31. At step S31, recording to the disc that is being loaded can be started. In this case, a clip AV stream file is newly created. Clip information stored in a clip information file corresponding to the newly created clip AV stream file is written to an area that is different from the area for the clip information corresponding to the last created clip AV stream file in the nonvolatile memory 18.

Figure 33:
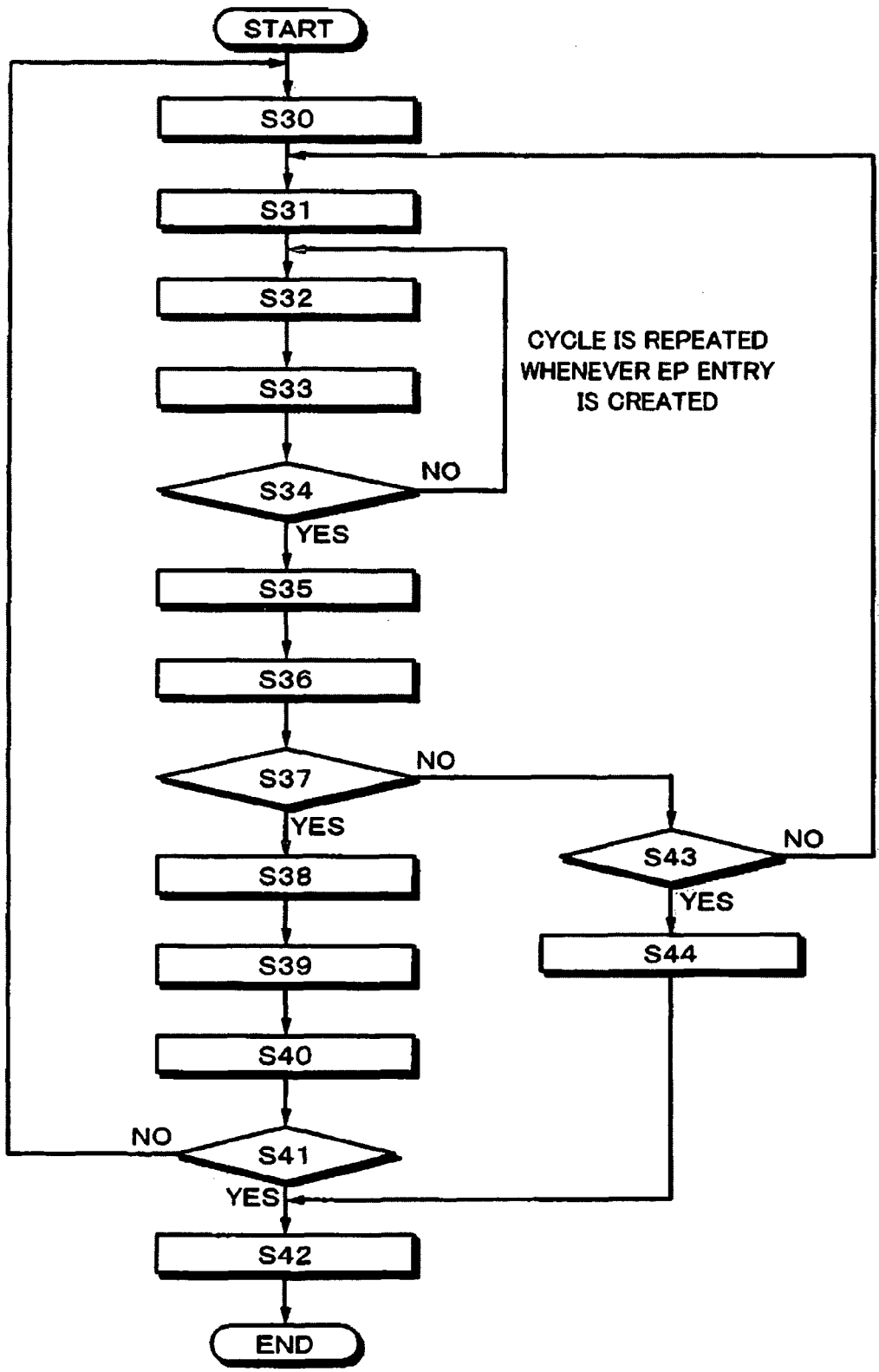
FIG. 33 is a flow chart showing an example of a method of recording a clip information file according to an embodiment of the present invention.

In the process shown in FIG. 33, for example, after the record stop operation is performed (at step S34) and clip information stored in a clip information file is written to the nonvolatile memory 18 (at step S35 and step S36), even if power is turned off unexpectedly without the power OFF operation, clip information has been stored in the nonvolatile memory 18. Thus, when power is turned on next time, reproduction for a clip AV stream file recorded on the disc can be controlled with clip information stored in the nonvolatile memory 18.

Even if power is unexpectedly turned off before the record stop operation is performed at step S34, EP entry information created immediately before the power is turned off has been stored in the nonvolatile memory 18 (step S32 and step S33). Thus, when power is turned on next time, reproduction for a clip AV stream file recorded on the disc can be controlled with EP entry information stored in the nonvolatile memory 18.

Figure 34:
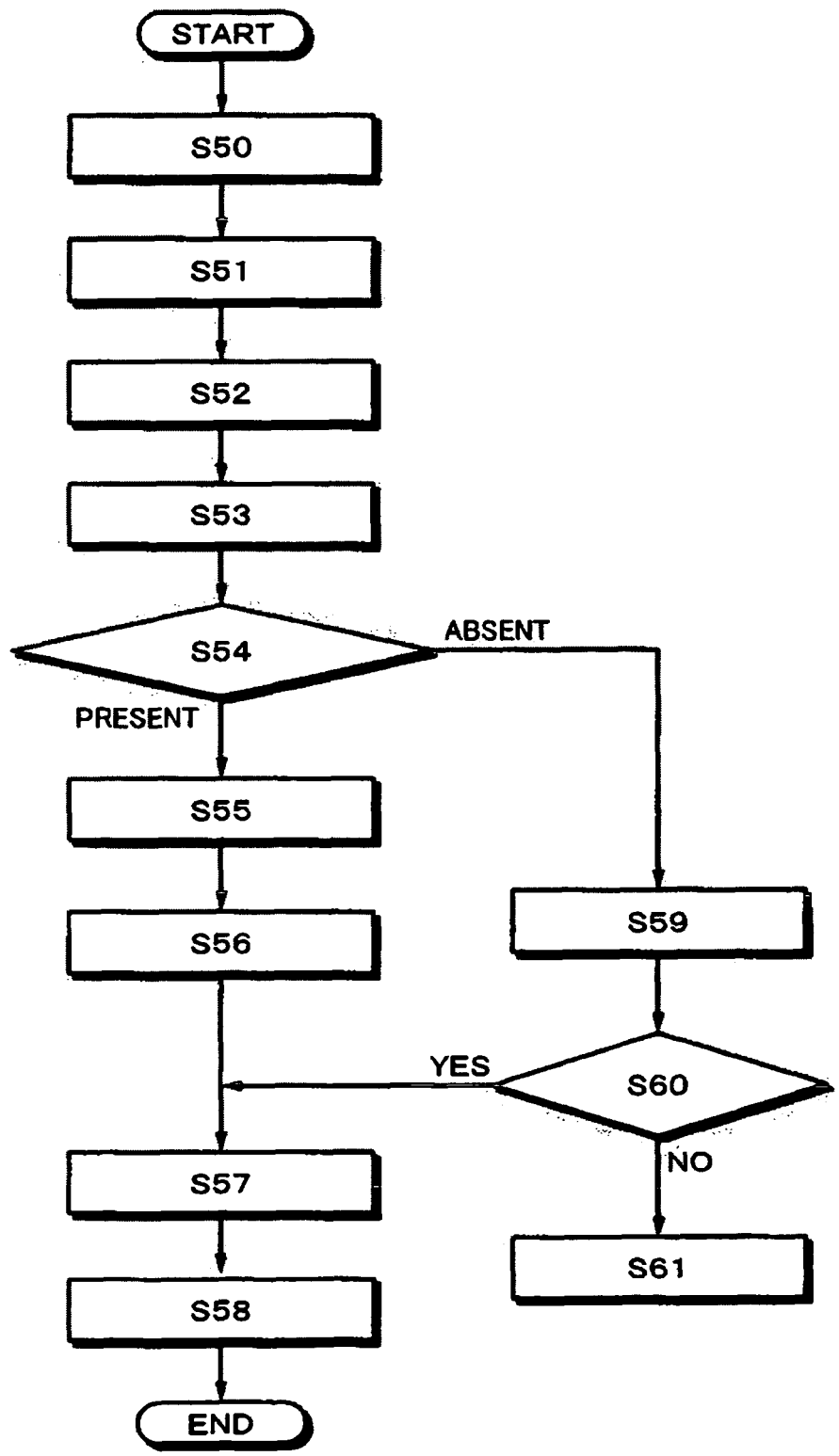
FIG. 34 is a flow chart showing an example of a reproducing process for a disk by a recording and reproducing apparatus according to an embodiment of the present invention.

FIG. 34 is a flow chart showing an example of a reproducing process for the disc by the recording and reproducing apparatus according to an embodiment of the present invention. Unless a disc has been loaded in the last stop state of the apparatus, first of all, a disc is loaded into the recording and reproducing apparatus (at step S50). At the next step S51, an index file and a movie object file are read from the disc. The control section 30 obtains information of the index file from the management information processing section 16 and causes the display section (not shown) of, for example, the UI section 31 to display title information based on the obtained information. The user operates the UI section 31 based on the displayed title information and designates a title to be reproduced (at step S52).

When a title to be reproduced has been designated, a movie object to be linked to the title is referred from the movie object file and a play list file is read from the disc according to a navigation command (at step S53) and reproduction for a clip AV stream file is started according to the description of the play list file. In other words, a clip information file referred from a play item described in a play list file is read from the disc and the corresponding clip AV stream file is reproduced on the basis of information of the clip information file.

At step S54, it is determined whether or not the clip information file referred from the play item described in the play list file has been recorded on the disc. If determined that the clip information file have been recorded, the flow of the process advances to step S55. At step S55, the clip information file is read from the disc. Clip information stored in the clip information file that has been read is written to the nonvolatile memory 18 at step S56. This clip information is also written to the volatile memory 17 (at step S57). Reproduction for the corresponding clip AV stream file is controlled on the basis of the clip information written to the volatile memory 17 (at step S58).

In contrast, when determined at the foregoing step S54 that the clip information file referred from the play item to be currently reproduced have not been recorded on the disc, the flow of the process advances to step S59. For example, after the record stop operation has been performed, when power supply is unexpectedly turned off not through the normal procedure, the operation of the recording and reproducing apparatus is stopped without writing the clip information written in the nonvolatile memory 18 as a clip information file to the disc. This applies to the case that power is unexpectedly turned off while data are being recorded.

At step S59, contents stored in the nonvolatile memory 18 are referred. Thereafter, it is determined whether or not clip information stored in the nonvolatile memory 18 corresponds to that to be stored in the clip information file referred from the play item to be currently reproduced. If determined that they correspond, the flow of the process advances to step S57. At step S57, the clip information stored in the nonvolatile memory 18 is written to the volatile memory 17 and reproduction for the clip AV stream file is controlled on the basis of the clip information written to the volatile memory 17.

In contrast, when determined at step S60 that clip information stored in the nonvolatile memory 18 do not correspond to that to be stored in the clip information file referred from the play item to be currently reproduced, the flow of the process advances to step S61. At step S61, an error process is performed. Instead, when If determined at the foregoing step S59 that no clip information have been stored in the nonvolatile memory 18, the flow of the process can be caused to advance to step S61 where the error process is performed.

According to this embodiment of the present invention, unless the disc is ejected by the eject operation, the clip information is stored in the nonvolatile memory 18 of the recording and reproducing apparatus. Thus, when power is unexpectedly turned off and thereby a clip information file corresponding to a clip AV stream file recorded on the disc has not been recorded on the disc, reproduction of the clip AV stream file can be controlled on the basis of clip information stored in the nonvolatile memory 18.

In the foregoing, it was described that clip information stored in a clip information file is written to and stored in the nonvolatile memory 18. However, this description is just exemplary. For example, in addition to information stored in a clip information file, information stored in a play list file can be written to and stored in the nonvolatile memory 18. In this case, like a clip information file, a play list file is caused to be read and written to the disc when the power OFF operation is performed or the disc eject operation is performed.

FIG. 35 shows an example of the structure of a video camera apparatus 100 according to another example of an embodiment of the present invention. Since the structure of the recording and reproducing apparatus described with reference to FIG. 32 can be nearly applied for the structure of the recording and reproducing system of the video camera apparatus 100, sections that are in common with those shown in FIG. 32 are designated by the same reference numerals and their detailed description will be omitted.

In the structure shown in FIG. 35, a camera section 50 has an optical system 51, an image capturing device 52, a captured image signal processing section 53, a camera control section 54, a video signal processing section 58, and a display section 55 as a structure with respect to a video signal. The camera section 50 has a microphone (MIC) 56, an audio signal processing section 57, and a speaker section SP 60 as a structure with respect to an audio signal. By exchanging various types of control signals and information with each section of the camera section 50, the control section 30 controls the operation of the camera section 50. In addition, the control section 50 controls the operations of the camera section 50 on the basis of control signals supplied from the UI section 31 according to user's operations.

When structured as the video camera apparatus 100, the record start operation and the record stop operation are normally performed such that, for example, a single record switch disposed in the UI section 31 is used and whenever the record switch is pressed, the start and stop of recording are alternately designated. In this video camera apparatus 100, a disc record medium such as a recordable type DVD or Blu-ray Disc is applied for the record medium 32.

In the camera section 50, the optical system 51 has a lens system that guides light from a subject to the image capturing device 52, a diaphragm adjustment mechanism, a focus adjustment mechanism, a zoom mechanism, a shutter mechanism, and so forth. The operations of the diaphragm adjustment mechanism, the focus adjustment mechanism, the zoom mechanism, and the shutter mechanism are controlled by the camera control section 54 on the basis of control signals supplied from the control section 30.

The image capturing device 52 is composed, for example, of a CCD (Charge Coupled Device). The image capturing device 52 converts light emitted through the optical system 51 into an electric signal by the photoelectric conversion, performs predetermined signal processes, and outputs the resultant signal as a captured image signal. The captured image signal processing section 53 performs predetermined signal processes for the captured image signal that is output from the image capturing device and outputs the resultant signal as base band digital video data. For example, the captured image signal processing section 53 causes a CDS (Correlated Double Sampling) circuit to sample only a signal that has image information of the captured image signal that has been output from the image capturing device 52 and remove noise from the sampled signal, and causes an AGC (Auto Gain Control) circuit to adjust the gain of the signal. Thereafter, the captured image signal processing section 53 converts the resultant signal into a digital signal by the A/D conversion.

In addition, the captured image signal processing section 53 sends information of the captured image signal that has been output from the image capturing device 52 to the control section 30. The control section 30 generates a control signal for controlling the optical system 51 based on this information and supplies the control signal to the camera control section 54. The camera control section 54 controls the focus adjustment mechanism, the diaphragm adjustment mechanism, and so forth based on the control signal.

The video signal processing section 58 performs predetermined signal processes for the supplied digital signal. For example, the video signal processing section 58 performs a detection signal process for the supplied digital signal and thereby extracts components of colors of R (red), G (green), and B (blue) from the supplied digital signal. The video signal processing section 58 performs processes such as γ correction, white balance correction, and so forth based on the extracted color components and finally outputs one sequence of baseband digital video data.

The display section 55 uses for example an LCD (Liquid Crystal Display) as the display device and can display an image based on digital video data supplied from the video signal processing section 58. The display section 55 is used as a monitor for a captured image upon image-capturing. The display section 55 can display a reproduced image upon reproducing.

The audio signal processing section 57 A/D converts an analog audio signal supplied from for example the microphone MIC 56, obtains digital audio data, performs predetermined audio signal processes such as noise reduction and sound quality correction for the digital audio data, and outputs the resultant data as baseband digital audio data. In addition, the audio signal processing section 57 performs predetermined audio signal processes such as sound quality correction and sound volume adjustment for the supplied digital audio data, D/A-converts the resultant audio data, obtains an analog audio signal, performs an amplification process and so forth for the analog audio signal, and supplies the resultant signal to the speaker section SP 60.

Upon image-capturing, light that enters the image capturing device 52 through the optical system 51 is converted into an electric signal by the photoelectric conversion and output as a captured image signal. The captured image signal is processed, A/D converted, and output as a digital video signal by the captured image signal processing section 53. The digital video signal is supplied to the video signal processing section 58. The video signal processing section 58 performs predetermined signal processes such as image quality correction for the supplied digital video signal and outputs the resultant signal as digital video data. This digital video data are supplied to the recording and reproducing section 10 and input to the terminal 40.

In addition, the video signal processing section 58 creates digital video data that are displayed on the display section 55 on the basis of the digital signal supplied from the captured image signal processing section 53. Moreover, the video signal processing section 58 can exchange signals with the control section 30 and create an image based on a display control signal generated by the control section 30 in a predetermined manner. This digital video data and image are supplied to the display section 55 and displayed thereon.

On the other hand, the audio signal that is output from the microphone 56 is supplied to the audio signal processing section 57. The audio signal processing section 57 performs predetermined signal processes such as noise reduction, limiter process, and sound quality correction for the audio signal, A/D-converts the resultant signal, and outputs the resultant signal as digital audio data. The digital audio data are supplied to the recording and reproducing section 10 and then input to the terminal 41.

When the record switch disposed in the UI section 31 is pressed in the record stop state, a control signal that commands the start of recording is supplied from the UI section 31 to the control section 30. As a result, the base band digital video signal and digital audio data that have been output from the camera section 50 are started to be recorded to the record medium 20 under the control of the control section 30.

In other words, as described above with reference to FIG. 32, the operations of the video encoder 11 and the audio encoder 12 are started under the control of the control section 30. The video data and the audio data are compression-encoded by the video encoder 11 and the audio encoder 12, respectively, and packetized and multiplexed in a predetermined manner as AV stream data by the MUX/DEMUX 13. The AV stream data are supplied to the recording and reproducing control section 15 through the stream buffer 14 and recorded as a clip AV stream file to the record medium 32.

As a clip AV stream file is recorded, an EP entry is created. An EP entry is created with the volatile memory 17 and the created EP entry is written to and stored in the nonvolatile memory 18 at a predetermined timing.

When the record switch of the UI section 31 is pressed next time, recording is stopped. Thereafter, according to processes after step S35 in the flow chart shown in FIG. 33, clip information stored in a clip information file is created, the created clip information is written to the nonvolatile memory 18. In addition, information stored in a play list file, for example, a play item and a play list mark, are added and updated. When the power OFF operation or the disc eject operation is performed, clip information and so forth written to and stored in the nonvolatile memory 18 are written to the disc. When the disc eject operation is performed, contents stored in the nonvolatile memory 18 are cleared.

Upon reproducing, when the record medium 32 is loaded into the video camera apparatus 100, files such as an index file and a movie object file recorded on the record medium 32 are read therefrom and supplied to the management information processing section 16. The control section 30 obtains information of the index file from the management information processing section 16 and generate a display control signal that causes a menu screen to be displayed on the basis of the obtained information. This display control signal is supplied to the video signal processing section 58 and displayed on the display section 55. When a predetermined operation is performed for the UI section 31 according to the menu screen, for example, a play list file caused to be reproduced is read from the record medium 32. A clip is reproduced from the record medium 32 according to description of the play list file.

In other words, as described with reference to FIG. 34, the control section 30 obtains information of a play list file from the management information processing section 16 according to an operation for the UI section 31 and commands the recording and reproducing control section 15 to read a clip information file and a clip AV stream file from the record medium 32 based on the obtained information.

At this point, according to the foregoing processes after step S54 shown in FIG. 34, it is determined whether or not a clip information file to be read on the basis of information of a play list file has been recorded on the record medium 32. When determined that the clip information file have been recorded, it is read from the record medium 32, clip information is written to and stored in the nonvolatile memory 18, and written to the volatile memory 17. In contrast, when determined that the clip information file to be read have not been recorded on the record medium 32, the nonvolatile memory 18 is referred and it is determined whether or not corresponding clip information has been stored. When the clip information has been stored, it is written to the volatile memory 17. The reproduction of a clip AV stream file is controlled on the basis of the clip information stored in the volatile memory 17.

The clip AV stream file that has been read from the record medium 32 is supplied to the MUX/DEMUX 13 through the stream buffer 14, the clip AV stream file is demultiplexed on the basis of header information of a packet or the like, and thereby compressed video data and compressed audio data are obtained. The compressed video data are supplied to the video decoder 20 and decoded thereby and then output from the terminal 42, for example, according to the PTS. On the other hand, the compressed audio data are supplied to the audio decoder 21 and decoded thereby and then output from the terminal 43 in synchronization with the video data that are output from the video decoder 20.

The video data that have been output from the terminal 42 are supplied to the video signal processing section 58, a predetermined signal process is performed for the video data thereby, and then supplied to the display section 55. The display section 55 displays an image based on the supplied video data. The audio data that have been output from the terminal 43 are supplied to the audio signal processing section 57, predetermined signal processes including an amplification process, are performed for the audio data thereby, and then supplied to the speaker section 60.

In the foregoing, as shown in FIG. 32, the case of which the present invention is applied to a recording and reproducing apparatus as an embodiment thereof was described. However, such description is just exemplary. In other words, processes performed upon recording according to the present invention as described with reference to the flow chart shown in FIG. 33 can be applied to a recording apparatus that performs only recording.

In the foregoing, it was described that the recording and reproducing apparatus shown in FIG. 32 and the recording and reproducing section 10 of the video camera apparatus 100 shown in FIG. 35 are structured as hardware. However, such description is just exemplary. In other words, the recording and reproducing section 10 may be structured as software. In this case, software is pre-stored, for example, in a ROM (not shown) of the control section 30. Instead, the recording and reproducing section 10 may be structured on a computer apparatus such as a personal computer. In this case, software that causes the computer apparatus to execute the recording and reproducing section 10 is recorded to a record medium such as a CD-ROM or a DVD-ROM and supplied therewith. When the computer apparatus can be connected to a network, the software can be provided through the network such as the Internet.

Description of Reference Numerals

10 RECORDING SECTION
11 VIDEO ENCODER
12 AUDIO ENCODER
13 MULTIPLEXER
14 STREAM BUFFER
15 RECORDING CONTROL SECTION
16 MANAGEMENT INFORMATION PROCESSING SECTION
17 VOLATILE MEMORY
18 NONVOLATILE MEMORY
20 RECORD MEDIUM
30 CONTROL SECTION
31 USER INTERFACE SECTION
50 CAMERA SECTION
100 VIDEO CAMERA APPARATUS
S10 OBTAIN LENGTH OF DATA TO BE RECORDED AND SET IT TO VALUE OF ExtDataLength(n+1).
S11 CHECK ExtDataLength AND ExtDataStartAddress OF EACH OF ext_data_entry( )'S LISTED IN CURRENT blkExtensionData( ) AND OBTAIN USE STATE IN DataBlock.
S12 DOES DataBlock HAVE SUCCESSIVE FREE AREA THAT IS EQUAL TO OR LARGER THAN ExtDataLength(n+1).
S13 INCREASE Length VALUE OF blkExtensionData( ) TO CREATE SUCCESSIVE FREE AREA EQUAL TO OR LARGER THAN ExtDataLength(n+1).
S14 DECIDE START ADDRESS OF AREA THAT STORES DATA AND SET IT AS ExtDataStartAddress(n+1).
S15 WRITE DATA HAVING LENGTH OF ExtDataLength (n+1) FROM ADDRESS REPRESENTED BY ExtDataStartAddress(n+1).
S16 ADD ExtDataLength(n+1) AND ExtDataStartAddress (n+1) TO ext_data_entry( ).
S20 OBTAIN ExtDataType FROM STANDARD ON WHICH DATA TO BE READ ARE BASED.
S21 OBTAIN ExtDataVersion FROM TYPE OF DATA TO BE READ BASED ON ExtDataType.
S22 READ ext_data_entry( )'S LISTED IN BlkExtensionData( ) ONE BY ONE.
S23 DO ExtDataType AND ExtDataVersion OF BOTH MATCH?
S24 READ ExtDataLength(i) AND ExtDataStartAddress(i).
S25 READ DATA HAVING LENGTH OF ExtDataLength(i) FROM ADDRESS REPRESENTED BY ExtDataStartAddress(i).
S26 HAVE ext_data_entry( )'S BEEN READ?
S27 DATA TRIED TO BE READ DO NOT EXIST.
S30 LOAD DISC.
S31 PERFORM RECORD START OPERATION.
S32 CREATE EP ENTRY.
S33 WRITE EP ENTRY TO NONVOLATILE MEMORY.
S34 PERFORM RECORD STOP OPERATION.
S35 CREATE FIXED VALUE INFORMATION.
S36 WRITE FIXED VALUE INFORMATION TO NONVOLATILE MEMORY.
S37 EJECT OPERATION?
S38 WRITE INFORMATION STORED IN NONVOLATILE MEMORY TO DISC.

S39 CLEAR NONVOLATILE MEMORY.
S40 EJECT DISC.
S41 POWER OFF?
S42 STOP OPERATION.
S43 POWER OFF?
S44 WRITE INFORMATION STORED IN NONVOLATILE MEMORY TO DISC.
S50 LOAD DISC.
S51 READ INDEX FILE AND MOVIE OBJECT FILE.
S52 DESIGNATE REPRODUCTION.
S53 READ PLAY LIST FILE.
S54 HAS CORRESPONDING CLIP INFORMATION FILE BEEN STORED?
S55 READ CLIP INFORMATION FILE.
S56 WRITE CLIP INFORMATION FILE TO NONVOLATILE MEMORY.
S57 WRITE INFORMATION STORED IN NONVOLATILE MEMORY TO VOLATILE MEMORY.
S58 PERFORM REPRODUCTION BASED ON INFORMATION STORED IN VOLATILE MEMORY.
S59 REFER TO NONVOLATILE MEMORY.
S60 DO DATA CORRESPOND TO EACH OTHER?
S61 PERFORM ERROR PROCESS.

The invention claimed is:

1. An apparatus for multiplexing video data and audio data and for recording the multiplexed video data and audio data to a record medium, the apparatus comprising:
a data input section configured to receive the video data and the audio data;
a recording section configured to multiplex the video data and the audio data into a multiplexed stream and record the multiplexed stream as a stream file to the record medium during a period of time;
an information storing section configured to store stream information associated with the stored stream file without requiring any supply of power;
a management information creating section configured to periodically create the stream information for the stream file at different times during the period of time; and
a control section for controlling the recording section and the management information creating section such that the control section causes the information storing section to periodically store the stream information created by the management information section during the record time,
wherein the stream information comprises at least one decoding unit start position and information associating the decoding unit start position with a corresponding clip AV stream file.

2. The apparatus as set forth in claim 1, wherein the control section controls the recording section to transfer the stream information stored in the information storing section to the record medium based on a predetermined timing.

3. The apparatus as set forth in claim 2, further comprising:
an eject control section configured to eject the record medium from the recording apparatus under control of the control section, and
the control section is configured to control the eject control section to eject the record medium based upon the predetermined timing.

4. The apparatus as set forth in claim 2, wherein the control section is configured to perform a power OFF operation to power Off the apparatus based upon the predetermined timing.

5. The apparatus as set forth in claim 1, wherein the information storing section is a non-volatile memory configured to store the stream information without the supply of power.

6. The apparatus as set forth in claim 1, wherein the apparatus is an image capturing apparatus further comprising:
an image capturing section configured to capture one or more images of a subject and output the video data corresponding to the captured images;
a sound collecting section configured to collect one or more sounds from the subject and output the audio data corresponding to the captured sound.

7. The apparatus as set forth in claim 1, wherein the stream information includes first information and second information dynamically determined when recording of the stream file is respectively started and stopped during the period of time, the first and second information respectively including a start address and an end address associated with the stream file, and,
wherein the stream information further includes static third information which remains fixed during the recording of the stream file.

8. The apparatus as set forth in claim 1, wherein the control section is further configured to:
reproduce the stream file stored in the record medium based on the stream information stored in the information storing section upon restoration of power without transferring the stream information from the information storing section to the record medium.

9. A computer-implemented method for multiplexing video data and audio data and recording the multiplexed video data and audio data to a record medium, the method comprising:
receiving the video data and the audio data;
multiplexing the video data and the audio data into a multiplexed stream and recording the multiplexed stream as a stream file to the record medium during a period of time;
creating, using a processor, stream information associated with the stream file at different times during the period of time;
periodically storing the stream information into a memory during the period of time, the memory being configured to maintain the stream information within the memory without requiring any supply of power,
wherein the stream information comprises at least one decoding unit start position and information associating the decoding unit start position with a corresponding clip AV stream file.

* * * * *